Nov. 23, 1937.    R. WILLSON    2,099,713
DEVICE FOR SOLVING RELATIVE MOVEMENT PROBLEMS
Filed Feb. 3, 1937    4 Sheets-Sheet 1

INVENTOR
RUSSELL WILLSON
BY
ATTORNEY

Nov. 23, 1937.   R. WILLSON   2,099,713
DEVICE FOR SOLVING RELATIVE MOVEMENT PROBLEMS
Filed Feb. 3, 1937   4 Sheets-Sheet 2

INVENTOR
RUSSELL WILLSON
BY
Robert A. Lavender
ATTORNEY

Nov. 23, 1937.  R. WILLSON  2,099,713

DEVICE FOR SOLVING RELATIVE MOVEMENT PROBLEMS

Filed Feb. 3, 1937  4 Sheets-Sheet 3

INVENTOR
RUSSELL WILLSON
BY
ATTORNEY

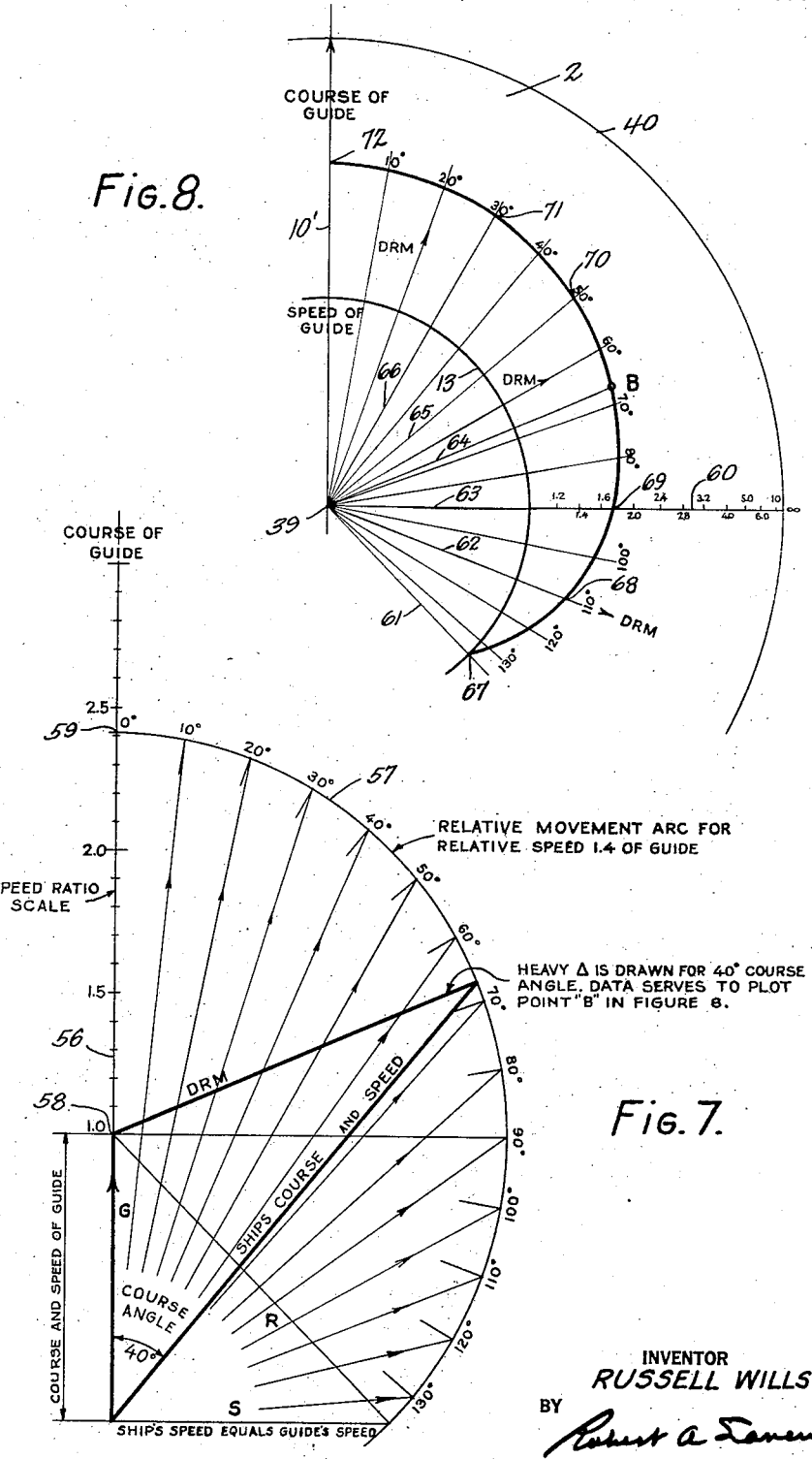

Patented Nov. 23, 1937

2,099,713

UNITED STATES PATENT OFFICE 2,099,713

DEVICE FOR SOLVING RELATIVE MOVEMENT PROBLEMS

Russell Willson, United States Navy

Application February 3, 1937, Serial No. 123,871

40 Claims. (Cl. 33—76)

(Granted under the act of March 3, 1883, as amended April 30, 1928; 370 O. G. 757)

My invention relates to a device for graphically solving relative movement problems and more particularly to a device for solving certain problems arising in movements of ships at sea and which may involve not only the movements of ships themselves relative to each other but also the firing and relative movements of torpedoes and targets.

Men-of-war proceeding in company at sea are maintained in orderly formation by being assigned positions measured in bearing and distance from a base ship called the guide. In maneuvers a ship is often required to proceed from an assigned position to some new position, likewise based on the guide. Now, if the guide were standing still, this new position based on the guide would also stand still and the maneuvering ship could head directly for its new position at any convenient speed. But, normally, the guide is moving and the new position moves with it. Therefore, the ship cannot head directly for its new position but must be steered for a point in advance thereof and its speed adjusted accordingly if that position is to be reached. The determination of proper course and speed under such circumstances, and times and distances involved in such maneuvers, constitute the relative movement or maneuvering board problems.

Experience has determined that the natural orientation for an officer maneuvering a ship from one position to another is as if he were at the center of an area and his desired position as on a bearing in a certain direction from him; and that the direction of the new position from him is either known or can be observed quite accurately. The device of my invention is based, among other things, on these facts and fundamentally solves the inter-related values of the relative movement triangle in a new and convenient manner and without recourse to the conventional parallel rulers, compasses and pencil.

Broadly, the device of my invention comprises two discs, or other suitably shaped members, and two arms, all mounted concentrically and free to rotate. The upper disc is opaque and carries on its face two families of curves for cooperation with one of the arms and on its back two similar families of curves but covering a smaller area for cooperation with the remaining arm. The lower disc is transparent and is marked on both sides at its periphery in degrees from 0–360. The upper or front arm is the full diameter in length and is joined at one end with the other and short arm of radius length on the back of the upper disc so that the two arms rotate together. Both arms are provided with certain scales, the upper arm in addition supporting a slidable strip with a scale of ratios and a logarithmic speed scale for cooperation respectively with certain upper arm scales and the families of curves.

Among the unique and novel features presented by my device the following may be mentioned. The construction of the device is such that the eye of the tactical officer is always at its center, the natural position from which all maneuvers of the ship are viewed. The logarithmic speed scale provides a direct reading feature by which actual speeds may be used in the solution of problems instead of speed ratios. The scale of ratios on the slidable strip in cooperation with certain scales on the large arm enables a calculation of the time required for the maneuver as well as the determination of limiting ranges for torpedo fire.

With the device of my invention it is possible to solve a large variety of relative movement problems as will be pointed out more in detail hereinafter and for many problems it is far more rapid and, in general, is more direct reading than the mooring board. The device has proved of inestimable value on the bridge of destroyers where space and personnel are limited, where events move rapidly and where weather and gunfire make pencils, rulers and drafting machines difficult to handle. In maneuvering a division of destroyers the greatest value of the device was found to lie in the fact that the division commander could operate it himself while moving about the bridge, without the delay of getting solutions from another officer and without the necessity of explaining to someone else what was in his mind concerning the maneuver and awaiting the plotting of the data and the report of the solution. In a rapidly changing situation, such as a torpedo attack, the device has also proved to be of marked utility since it permits a following of the situation without the confusion caused by the presence of many plotted lines on a mooring board as the maneuver progresses or new solutions are required.

With the foregoing preliminary discussion in view it is an object of my invention to provide a simple and compact device for solving relative movement problems and which will quickly and expeditiously accomplish its intended function without recourse to the conventional compasses, pencil and parallel rulers.

It is another object of my invention to provide a device for solving relative movement problems which is adapted for use on a maneuvering ship and is of such design that the eye of the tactical officer is always at the center of the device which is the logical position from which all maneuvers are viewed.

It is another and further object of my invention to provide a device for solving relative movement problems which includes as part thereof a logarithmic speed scale thus enabling the use of actual speeds in the solution of problems instead of speed ratios.

It is another and further object of my invention to provide a device for solving relative movement problems by means of which, among other things, the time required for the completion of a maneuver and the limiting ranges for torpedo fire may be quickly and accurately determined.

It is another and still further object of my invention to provide a device for graphically solving the inter-related values of the relative movement triangle in an entirely novel and exceedingly convenient manner.

Other objects and many of the attendant advantages of this invention will be readily appreciated as the same becomes better understood by reference to the following detailed description when considered in connection with the accompanying drawings, wherein.

Figure 6:
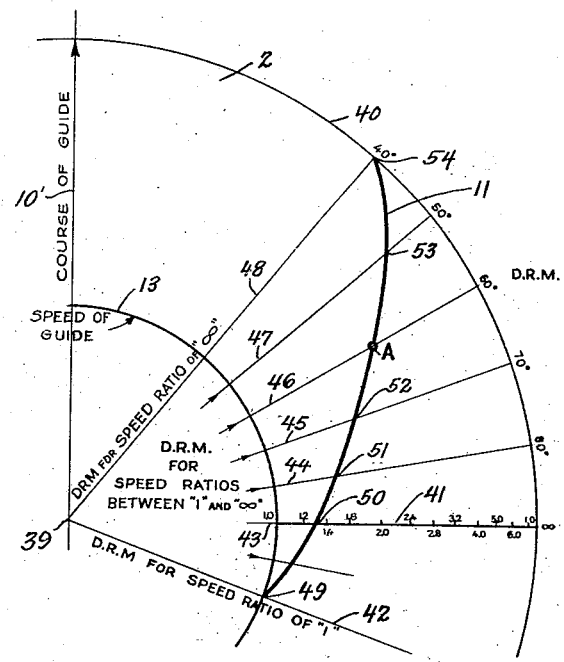
Figure 5:
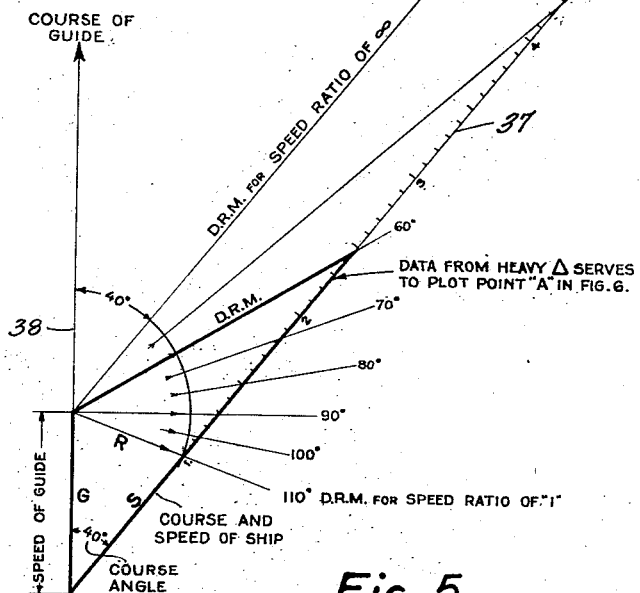
Fig. 5 shows the method of obtaining the data necessary for plotting one of a family of curves which represent various course angles.

Fig. 6 discloses the manner of plotting one of a family of curves representing various course angles from the data obtained by the constructions of Fig. 5;

Fig. 7 shows the method of obtaining the data necessary for plotting one of a family of curves which represent loci of convenient ratios of the speed of relative movement of the maneuvering ship of the speed of the guide; and Fig. 8 discloses the method of plotting one of a family of curves representing loci of convenient ratios of the speed of relative movement of the maneuvering ship to the speed of the guide from the data obtained by the constructions of Fig. 7.

Before proceeding with a detailed description of the instant invention, it is deemed necessary in the interest of clarity to define certain technical terms which will be used extensively in the specification and some of which appear in the claims. The terms and their definitions are as follows:

*Guide.*—The ship upon which the maneuvering ship bases its maneuver.

*Maneuvering ship or ship.*—The vessel performing the maneuver and on which the device of my invention is to be used.

*Course angle.*—The difference between the course of the guide and the course of the ship, the angle represented thereby being usually measured in degrees.

*True courses and bearings.*—Courses and bearings usually indicated in degrees 0–360 from true north.

*Relative courses and bearings.*—Courses and bearings indicated with reference to the heading of a certain ship.

*Relative movement.*—The movement of the maneuvering ship relative to the movement of the guide. It is represented in direction and amount by the line traced by the ship's successive positions, viewed from the guide, as the ship proceeds from its initial position to its new position.

*Relative movement line.*—The line along which the maneuvering ship appears to move as viewed from or plotted from the guide.

*Relative speed.*—The rate of movement of the maneuvering ship along the relative movement line.

The relative movement triangle

Figure 4:
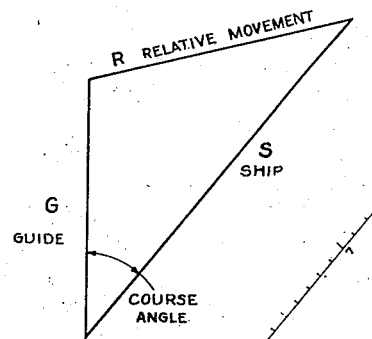
Fig. 4 depicts the relative movement triangle which forms the mathematical basis of my device.

Turning now to the drawings there is shown in Fig. 4 the speed and direction, or relative movement, triangle which forms the mathematical basis for my device and by means of which all relative movement problems may be graphically solved. In the triangle, side G, in its direction and length, represents the course and speed of the guide; side S, in its direction and length, the course and speed of the maneuvering ship; and side R, in its direction and length, the direction and speed of relative movement of the maneuvering ship with respect to the guide. The direction of movement is always indicated by the arrows; that is, G and S start from the vertex opposite R and R is always taken in a direction from G toward S.

As each side of this triangle represents a direction and a speed or rate of movement, the whole triangle represents six elements which are as follows:

Side G: Item 1—Course of guide; Item 2—Speed of guide.

Side S: Item 3—Course of ship; Item 4—Speed of ship.

Side R: Item 5—Direction of relative movement; Item 6—Speed of relative movement.

Having given any four of these items, the other two may be obtained graphically. Fundamentally, the device of my invention merely solves the six inter-related values of the relative movement triangle by a new and convenient method designed from experience to furnish solutions in a manner most expeditious and convenient for use on the bridge of a fast moving vessel, such as, for example, a destroyer maneuvering at sea.

As indicating some of the types of problems which my device is capable of solving, the following may be enumerated: course and speed problems; time and distance problems; and composite problems. Course and speed problems are the most common on the bridge at sea and most frequently occur of the following form: Known; Item 1—Course of guide, Item 2—Speed of guide, Item 4—Speed of ship, Item 5—Direction of relative movement; Required; Item 3—Course of ship. Relative speed (Item 6) is little used in these problems but may be obtained if desired.

Time and distance problems are frequently met on the bridge at sea being merely course and speed problems with the added problem of finding the time required for the maneuver and occasionally the distance which the ship will travel during the maneuver. In these problems relative speed (Item 6) is used in conjunction with relative distance to obtain the time of the maneuver. Relative distance is merely the amount of relative movement involved in reaching the new position.

Composite problems include the more complicated problems met at sea. Such problems involve limiting times, courses or distances and sometimes change of course or speed during maneuvers. They also include combined ship and torpedo problems.

The essential parts of the device

Figure 1:
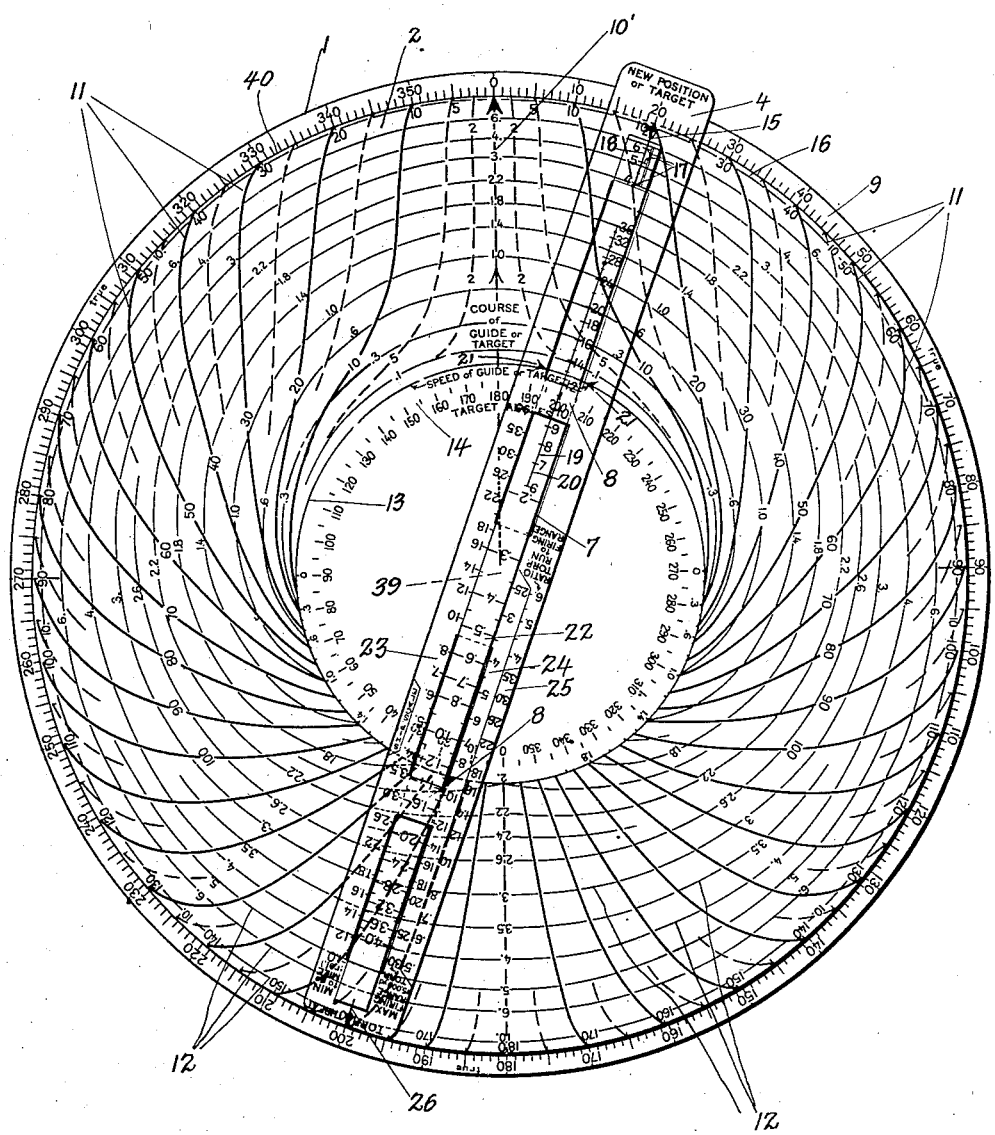
Fig. 1 is a front plan view of the device of my invention.
Figure 2:
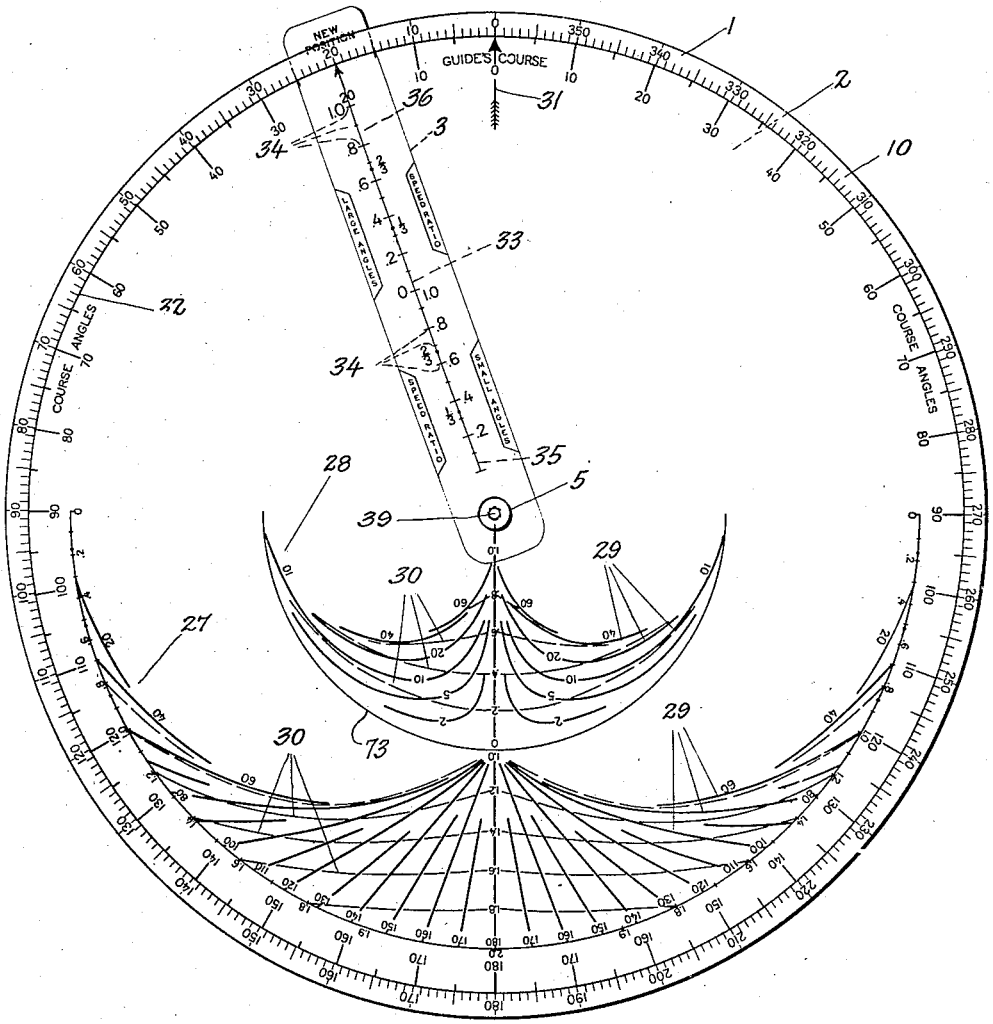
Fig. 2 is a rear plan view of the same.
Figure 3:
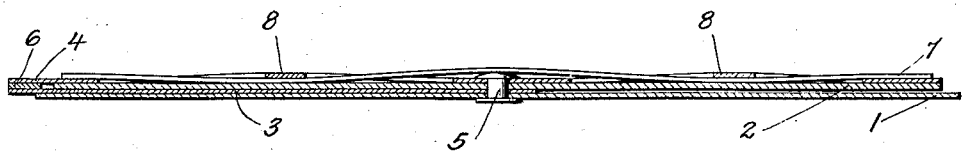
Fig. 3 is a view in sectional elevation of my device taken on Fig. 1 along the center line of the large arm.

Referring now to Figs. 1, 2 and 3 of the drawings, there is shown depicted therein a lower transparent disc 1 or other suitably shaped member, an upper opaque disc 2 or other suitably shaped member, a lower arm 3 and an upper arm 4, all secured together by any suitable means 5 and free to rotate. The two discs 1 and 2 are concentrically arranged and have interposed therebetween the smaller or lower arm 3 which extends radially from the securing means 5 to a position where a spacer element 6 can be conveniently placed between both arms and the same cemented or secured together in any suitable manner. The upper arm 4 as shown is of extended dimensions and supports in any convenient manner a strip 7 which is slidable in a direction longitudinally of the arm. As illustrative of one mode of supporting the strip 7 for slidable movement the arm 4 is shown slotted to provide two bridge portions 8, 8 the strip 7 then being threaded beneath both bridge portions and over the securing means 5 in a manner clearly shown in Fig. 3. It is at once evident that the upper disc 2 may be adjusted to any position with respect to the lower disc 1; and that both arms 3 and 4 by virtue of their securement at one end are freely adjustable as a unit to any position with respect to either the upper or the lower disc.

The lower or transparent disc 1 is marked on both sides at its periphery or circumference in degrees from 0–360 to thus provide peripheral scales 9 and 10 so as to enable the solution of problems involving true courses and bearings. Any other units or any other mode of marking this disc at the periphery for the purpose described may be employed.

The upper or opaque disc 2 on its front side (Fig. 1) is provided with a line 10 extending in the direction of a diameter of the disc and having at one end thereof an arrow for cooperation with the peripheral scale 9 of the lower disc 1, the said line representing the course of the guide or target as the case may be. Also inscribed upon the face of the disc 2 and symmetrically arranged with respect to the line 10' thereof are two families of curves identified by the reference characters 11 and 12 respectively, the first family 11 of which represents course angles of the maneuvering ship with respect to the guide and the second family 12 representing loci of convenient ratios of the speed of relative movement of the maneuvering ship to the speed of the guide. The curves of the first family 11 are inscribed on the disc 2 in a relatively heavy manner in order to accentuate the same and make them easily distinguishable from the lightly inscribed curves of the second family 12. A "speed of guide or target" circle 13 is provided as shown with its center coinciding with that of the disc, the curves of the first family 11 extending from the circumference of this circle to the periphery or circumference of the disc where each of the curves terminates at a point angularly spaced from the course of guide line 10' an amount equal in value to the course angle for which the curve in question is constructed. Thus the 10° course angle curves to the right and left of the course of guide line 10' each terminate at the periphery of the upper disc 2 at points which are 10° to the right and left of the said line 10'; the 20° curves at points 20° to the right and left of the line; etc.

This is an important feature of my device in that since the upper disc 2 is graduated at its circumference, in degrees from 0 to 180 to the right and left of the course of guide line 10' to thus provide a circumferential scale 16, it is possible to solve problems involving only courses and bearings relative to the course of the guide thus avoiding the necessity for employing true bearings and courses and hence avoiding the necessity, of using the lower disc 1. The curves of the second family 12 which represent loci of convenient ratios of the speed of relative movement of the maneuvering ship to the speed of the guide do not have any portions thereof terminating at the circumference of the disc although some of the curves extend between symmetrical points on the circumference of the speed circle 13. A scale 14 within the speed circle is used for measuring target angles.

The upper arm 4 is provided at one end with a center line 15 having an arrow at the end thereof for cooperation with the peripheral scales 9 and 16 on the lower and upper discs 1 and 2 respectively, the said line 15 representing the direction of relative movement of the maneuvering vessel or torpedo, i. e., the direction of the new position or target as stated by the legend appearing on the arm. A series of markings 17 representing ratios of the speed of the maneuvering ship to that of the guide is laid off along the center line 15 of the arm in a manner to be described more in detail hereinafter and thus provides a ratio scale which is identified in general by the reference character 18. This scale 18 is designed for cooperation with both families of curves 11 and 12. The slidable strip 7 supported by the arm 4 is also provided with a center line 19 which extends in the direction of the center line 15 of the arm 4 and hence also in the direction of relative movement of the maneuvering vessel. Along line 19 on the slidable strip 7 there are laid off divisions of a logarithmic scale of speeds in knots, or some other convenient unit, which represent actual speeds of the guide and maneuvering ship, the logarithmic speed scale 20 thus formed being designed for cooperation with the speed circle 13 and both families of curves 11 and 12. When using the logarithmic speed scale 20 the point thereof which is chosen as the speed of the guide is placed in alignment with the two arrows 21 on the arm 4 to insure coincidence of this point with the guide speed circle, the other selected point of the scale representing the speed of the maneuvering ship which being the greater falls into the area occupied by the two families of curves 11 and 12.

The remaining portion of the slidable strip 7 is provided with a scale 22 of ratios of the speed of relative movement of the maneuvering ship to the speed of the guide, the ratios corresponding to and including those used in establishing the various curves of the second family 12. The scale 22 of ratios on the slidable strip 7 is designed for cooperation with three scales 23, 24 and 25 inscribed on the large arm 4. The first scale 23 is a time scale and represents the required time in minutes for the maneuvering ship to traverse one mile in its direction of relative movement which fact is also marked on the large arm by a suitable legend. The second scale 24 represents the maximum firing range for 15,000-yard, 27-knot torpedoes; and the third scale 25 represents the ratio of the torpedo run to its firing range. Finally, the large arm 4 is provided with a line 26 extending in the direction of its center line and having an arrow at its end adjacent the legend "Torp.

threat" for cooperation with the peripheral scales 9 and 16 of the lower and upper discs 1 and 2 respectively. This line 26 may, if desired, be used in the solution of torpedo evading problems.

It is to be emphasized at this point that the front of the device described in the preceding paragraphs is used in about 90 per cent of the required solutions for the reason that it covers the most common relative movement problems, namely, those in which the speed of the maneuvering ship is equal to or greater than the speed of the guide. It also covers practically all torpedo problems.

The back of the device (Fig. 2) is used less frequently and solves those problems in which the speed of the maneuvering ship is less than the speed of the guide. In such cases there are two solutions for each problem, the large course angle solution and the small course angle solution. Thus, as shown in Fig. 2 the back side of the upper disc 2 which is visible through the transparent lower disc 1 is provided with two areas of curves, 27 and 28 respectively, the outer area 27 being used for large course angle solutions and the inner area 28 for small course angle solutions. Each area consists of two families of curves, the first of which is identified by the reference character 29 and represents like the first family of curves 11 on the front side of the disc 2 course angles of the maneuvering ship with respect to the guide; and the second family of curves identified by the reference character 30, and in a manner similar to the second family of curves 12 on the front side of the disc 2, representing loci of convenient ratios of the speed of relative movement of the maneuvering ship to the speed of the guide. A line 31 inscribed on the upper disc 2 has an arrow at one end and extends in the direction of a diameter of the disc, the line representing the course of the guide and being designed for cooperation with the peripheral scale 10 of the lower or transparent disc 1. It should be carefully noted at this time that the lower or transparent disc 1 is free from any markings except for the peripheral scales 9 and 10 on both sides thereof. The back side of the upper disc 2 is also provided at its circumference with a scale 32 of course angles by means of which any course angle may be transferred to the true course of the maneuvering ship in conjunction with the peripheral scale 10 of the lower or transparent disc 1. The portions of the scale 32 to the right and left of the course of guide line 31 are symmetrically arranged with respect thereto and are identically numbered.

The lower or smaller arm 3 interposed between the lower transparent and upper opaque discs 1 and 2 is provided with a center line 33 having an arrow for cooperation with the circumferential and peripheral scales 10 and 32 on the lower transparent disc 1 and upper opaque disc 2 respectively, the said line representing the direction of relative movement of the maneuvering ship, i. e., the direction of the new position as stated by the legend appearing on the smaller arm. A series of markings 34 representing ratios of the speed of the maneuvering ship to that of the guide is laid off along the line 33 to thus provide two identical speed ratio scales 35 and 36, the inner scale 35 of which is designed for cooperation with the inner area of curves 28 and the outer scale 36 of which is designed for cooperation with the outer area of curves 27.

As pointed out hereinbefore the relative movement triangle forms the mathematical basis of my device, this triangle being shown in Fig. 4 and having been carefully described previously herein. The construction of the two families of curves which represent respectively various course angles of the ship with respect to the guide and loci of convenient ratios of the speed of relative movement of the maneuvering ship to the speed of the guide is based on the relative movement triangle. The manner of constructing these two families of curves will now be described in detail.

*The construction of the first family of curves*

Referring again to the drawings there is shown in Fig. 5 thereof the graphical method employed for obtaining the data necessary for plotting one of a family of curves which represent various course angles; and in Fig. 6 the manner of plotting one of such curves from the data obtained by the constructions of Fig. 5. The constructions in Figs. 5 and 6 are shown specifically for the family of curves 11 appearing on the front of the device, that is for those cases in which the speed of the maneuvering ship is equal to or greater than the speed of the guide. Briefly, there is obtained graphically in Fig. 5 by constructions employing relative movement triangles of fixed and identical course angles, the directions of relative movement (D. R. M.) of the maneuvering ship for different ratios of the speed of the maneuvering ship to the speed of the guide. These data so obtained are then used in Fig. 6 to plot a curve which represents the chosen or fixed course angle, the curve being plotted by a system of polar coordinates wherein the radial ordinate represents, to a convenient scale, the ratio of the speed of the maneuvering ship to that of the guide and the angular ordinate the direction of relative movement of the maneuvering ship.

Now it will be remembered from the previous discussion of the relative movement triangle depicted in Fig. 4 that each side of this triangle represents a direction and a speed or rate of movement, the whole triangle representing six elements which were tabulated as Items 1 to 6 inclusive. In Fig. 5, the side G of the relative movement triangle is fixed in direction and length thus fixing the course (Item 1) and speed (Item 2) of the guide. Side G of the relative movement triangle may be chosen of any convenient length. The side S is drawn in an arbitrary direction thus fixing the course (Item 3) of the ship since the course angle has a constant value for each curve, being chosen for illustrative purposes in the instant case as 40°. Now for various lengths of S corresponding to various speeds of the ship (Item 4) and which are either equal to or greater than the length of G, the relative movement triangle is completed by drawing the side R thus fixing the direction of relative movement or D. R. M. (Item 5) of the maneuvering ship for any speed S thereof.

In order to facilitate the construction of the various relative movement triangles for various ratios of the speed of the ship to that of the guide a speed ratio scale 37 is drawn in the direction of the side S of the relative movement triangle, the zero of the scale coinciding with the vertex of the triangle which is opposite the side R. The major divisions or lengths of this scale 37 numbered 1, 2, 3, 4, etc., are multiples of the length of the side G thus representing speeds of 1, 2, 3, 4, etc., times that of the guide. For convenience in construction each major division of the speed ratio scale 37 is divided into 10 equal parts. Thus, it is at once evident that any point of the scale represents a definite ratio of the speed of the maneuvering ship to that of the guide. The direction of relative movement (D. R. M.) or the direction of the side R of the various relative movement triangles is measured by any convenient angular measure clockwise from the course of guide line 38.

From the graphical constructions in Fig. 5 the following data may be compiled for utilization in the plotting of the curve of Fig. 6.

*Data for constant course angles of 40°*

| Speed ratio | D. R. M. |
|---|---|
| | Degree |
| 1.00 | 110 |
| 1.30 | 90 |
| 1.55 | 80 |
| 1.90 | 70 |
| 2.50 | 60 |
| 4.30 | 50 |
| 00 | 40 |

In connection with this data it is to be observed that for an infinite speed ratio the direction of relative movement (D. R. M.) of the maneuvering vessel is identical with its course which, in the instant case, for illustrative purposes, is taken as 40°. This is an important fact since it applies to all curves of the first family of curves and permits the solution of problems involving courses and bearings relative to the guide without reference to the lower disc 1 as well as the quick conversion of courses and bearings to true courses and bearings by means of the peripheral scale 9 on the lower disc 1.

Reference is now made to Fig. 6 of the drawings to show how the data obtained from the graphical constructions of Fig. 5 are utilized in plotting a course which represents a predetermined course angle of the maneuvering ship with respect to the guide. This figure discloses a fragmentary portion of the front side of the upper or opaque disc 2 the center of which is shown at 39, the speed of guide circle at 13, the course of guide line at 10' and the periphery of the disc at 40. The curve 11 of Fig. 6, as well as the remaining curves of the first family 11, are plotted by a system of polar coordinates, the radial ordinate of which represents the speed ratio or the ratio of the speed of the maneuvering ship to that of the guide and the angular ordinate the direction of relative movement (D. R. M.) of the maneuvering ship. The center of the system of polar coordinates coincides with the center 39 of the disc 2.

With regard to the radial ordinate the following general remarks are first made which incidentally are applicable to all curves on both sides of the disc 2. The radial ordinate may be measured to any convenient scale. If, however, the speed ratios extend to infinity an arbitrary and much compressed scale must be used at the higher ratio values in order to keep the upper or opaque disc 2 within a size that can be conveniently handled. Thus the radial ordinate may be measured to a metric scale, an English scale, a purely arbitrary scale, or to a logarithmic scale based on any convenient system of logarithms whether natural, common or otherwise or to any combination of the aforesaid scales. In connection herewith an important feature in the design of my device must be noted. Whatever the scale finally chosen by which to measure the length of the radial ordinates for the various speed ratios, this scale must be reproduced on either the large arm 4, or small arm 3, or on the slidable strip 7 carried by the large arm 4, or partly on the large arm and partly on the slidable strip, all depending on the character of the scale finally chosen as will be pointed out more particularly hereinafter.

In Fig. 6 it was deemed expedient to employ a compound speed ratio scale for measuring the lengths of the radial ordinates for various speed ratios. This scale is identified in general by the reference character 41 and consists of a logarithmic portion based on any convenient system of logarithms for speed ratios from 1 to 4 and an arbitrary compressed portion for speed ratios from 4 to 00. My reason for this choice resides in the fact that in the average relative movement problem encountered at sea the speed of the maneuvering ship is seldom greater than four times that of the guide. Hence by making the scale portion covering the range from 1 to 4 logarithmic the average problem encountered can be solved by employing speeds in knots directly, the logarithmic speed scale 20 inscribed on the slidable strip 7 and cooperating with the curves making such a solution possible. Since higher speed ratios from 4 to 00 are considered in the plotting of the curve of Fig. 6 it was necessary to employ an arbitrary, much compressed scale for speed ratios from 4 to 00.

As previously explained, the origin of the system of polar coordinates is at the center of the disc which is identified by the reference character 39. In plotting the curve of Fig. 6 the angular ordinates are reckoned right and left from the course of guide line 10' and the radial ordinates are measured to the compound speed ratio scale discussed hereinbefore outwardly from the speed of guide circle 13. In order to show in detail how the curve of Fig. 6 is plotted the data obtained from the constructions of Fig. 5 and appearing on page 5 are again referred to.

In constructing the curve of Fig. 6, lines corresponding to the angular ordinates are first drawn. Thus, with an angle of 110° measured clockwise from the course of guide line 10' the line 42 is drawn; for an angle of 90° the line 43; for the angle 80° the line 44; and for the angles 70°, 60°, 50° and 40° the lines 45, 46, 47 and 48 respectively. Since the speed ratio corresponding to the D. R. M. of 110° is 1.00 the point (1.00, 110°), identified by the reference character 49, will fall on the speed of guide circle as shown. For a D. R. M. of 90° the speed ratio is 1.30. With a pair of compasses a distance corresponding to the ratio 1.30 is measured to the logarithmic portion of the compound speed ratio scale 41, this distance being laid off along the line 43 from the speed of guide circle 13, thus determining the point 50. Similarly, for a D. R. M. of 80° the speed ratio 1.55 is measured to the logarithmic portion of the compound speed ratio scale and laid off along the line 44 from the speed of guide circle 13 to thereby determine the point 51. Point 52 and point A are similarly determined for speed ratios of 1.90 and 2.50 respectively measured to the logarithmic portion of the compound speed ratio scale 41. For a D. R. M. of 50° it is noted that the speed ratio is 4.30. In determining point 53 (4.30, 50°) the length of the radial ordinate is ascertained by placing the points of the divider along the compound speed ratio scale with one point at the unit 1.0 and the other point of the divider at 4.3 thereof. This distance is then laid off along the line 47 from the speed of guide circle 13 to thereby fix the point 53. Point 54 (00, 40°) lies at the periphery of the disc 2 and is similarly determined. Through the points 49, 50, 51, 52, A, 53 and 54 thus plotted there is drawn a smooth curve identified by the reference character 11 which is the course angle curve for the fixed course angle of 40°. It should be carefully noted that curve 11 as finally constructed terminates at a point on the periphery 40 of the disc 2 which is angularly spaced from the course of guide line 10' an amount equal in value to the course angle for which it was constructed. All other curves of the first family of curves 11 are constructed in a manner identical with that shown in Figs. 5 and 6 except that each of the remaining curves is constructed for a different course angle.

*The construction of the logarithmic speed scale and the fixed speed ratio scale*

The logarithmic speed scale 20 (Fig. 1) on the slidable strip 7, which has inscribed thereon speeds from 6 to 36 knots, is constructed with the same system of logarithms as was employed in the construction of the logarithmic portion of the compound speed ratio scale 41 (Fig. 6). If now the speed of the guide is denoted by G and the point of the logarithmic speed scale 20 corresponding to this speed is adjusted to coincide with the speed of guide circle 13 by aligning it with the arrows 21; and the speed of the maneuvering ship is denoted by S and a point corresponding to this speed is selected on the logarithmic speed scale 20 such that it will fall somewhere within the area of the disc defined by the speed circle 13 and its periphery 40, the distance on the logarithmic speed scale 20 between the speed circle 13 and the point on the said scale corresponding to the speed of the maneuvering ship will be log S—log G, since the speed scale is logarithmic in character. But $$\log S - \log G = \log \frac{S}{G} = \log \frac{\text{speed of ship}}{\text{speed of guide}} = \log$$

(speed ratio). Thus, the logarithmic speed scale 20 converts direct speeds in knots of the maneuvering ship and guide into the logarithm of the ratio of the speed of the ship to that of the guide. Since, however, a portion of each curve of the first family 11 is constructed for the logarithm of various ratios of the speed of the maneuvering ship to that of the guide by employment of the logarithmic portion of the compound speed ratio scale 41, the logarithmic speed scale 20 on the slidable strip 7 in cooperation with the first family of curves 11, if the speed in knots of the guide and maneuvering ship are given, can determine or fix a definite relative movement triangle and thus effect the solution of relative movement problems.

The logarithmic speed scale 20 which is direct reading in knots, of course, cannot be used where the speed of the maneuvering ship is more than four times that of the guide. For ratios of the speed of the maneuvering vessel to that of the guide which are in excess of four, the fixed speed ratio scale 18 on the outer end of the large arm 4 must be employed. The markings 17 of this scale, which represent different speed ratios, are laid off along the line 15 to the same non-logarithmic, much compressed portion of the compound speed ratio scale 41 used in the construction of the first family of curves 11 for speed ratios from 4 to 00. This fixed scale 18 on the outer end of the arm 4 is of course not direct reading, it being necessary first to determine the ratio of the speed of the maneuvering ship to that of the guide before it can be used.

*The solution of course and speed problems*

At this point it is deemed expedient to show how the first family of curves 11 is used in the solution of course and speed problems which, as previously pointed out, represent one of many types of relative movement problems capable of being solved by my device. It will be recalled from the previous discussion herein of the relative movement triangle depicted in Fig. 4 that each side of this triangle represents a direction and a speed or rate of movement, the whole triangle representing six elements which were previously tabulated. Course and speed problems are most frequently encountered in the following form: Known: Item 1—Course of guide; Item 2—Speed of guide; Item 4—Speed of ship; Item 5—Direction of relative movement; Required: Item 3—Course of ship. This type of problem can be solved with my device for either true courses or courses relative to the guide. Its solution for true courses will first be explained.

With the true course of the guide given (Item 1) the arrow of the course of guide line 10' (Fig. 1) on the upper disc 2 is set to the true course on the peripheral scale 9 of the lower or transparent disc 1. The large arm 4 with its arrow at the new position or target end is adjusted until the arrow is set at the true direction of relative movement (Item 5) as read on the peripheral scale 9 of the large disc 1, i. e., the new position sought to be attained and bearing in a direction away from the operator of the device. A point on the logarithmic speed scale 20 corresponding to the speed of the guide (Item 2) is now brought into coincidence with the speed of guide circle 13 by adjusting the slidable strip 7 and aligning this point with the arrows 21. Finally, a point on the logarithmic speed scale is selected which corresponds to the speed of the ship (Item 4), it being assumed for this particular problem that the speed of the maneuvering ship does not exceed four times that of the guide. Having set the component parts of the device for four of the items of the relative movement triangle, namely: Item 1—Course of guide, Item 2—Speed of guide, Item 4—Speed of ship, Item 5—Direction of relative movement, a definite relative movement triangle is fixed or determined and the problem is solved. It remains now only to read the solution from the device.

The last point chosen on the logarithmic speed scale, namely that corresponding to the speed of the ship (Item 4), will fall onto and coincide with one of the first family of curves 11 representing course angles of the maneuvering ship with respect to the guide and thus immediately give the course angle of the relative movement triangle fixed by the aforesaid Items 1, 2, 4 and 5. This curve is now followed outwardly along the upper disc 2 to its periphery 40 where it terminates at a point which is angularly spaced from the course of guide line 10' an amount equal in value to the course angle for which the curve in question is constructed; and where in consequence the course of the maneuvering ship is identical with its direction of relative movement. Hence, the reading on the peripheral scale 9 of the lower disc 1 opposite the end or terminal point of the curve in question gives the true course of the ship (Item 3) which is the solution sought.

In illustrating the solution of definite problems in which actual figures are used, it is considered impractical to show by drawings the actual positions of the arms and discs. The solutions, however, have been taken from an actual reduction to practice instrument.

To further illustrate the use of my device in the solution of course and speed problems involving true courses, the following concrete examples are given:

*Problem one*

Given: Item 1—Course of guide, 55°, Item 2—Speed of guide, 13 knots, Item 4—Speed of ship, 22 knots, Item 5—Direction of relative movement, 160°. Required: Item 3—Course of ship.

In the solution of this problem the arrow of the course of guide line 10' is first set at 55° on the peripheral scale 9 of the lower disc 1 to thus fix the true course of the guide. The large arm 4 with its new position or target end is then adjusted so that the arrow thereon coincides with the 160° mark on the scale 9 thus fixing the true course of the direction of relative movement of the maneuvering ship. The point on the logarithmic speed scale 20 corresponding to the speed 13 of the guide is next placed in a position to coincide with the speed of guide circle 13 by aligning the same with the arrows 21. Finally, a point on the logarithmic speed scale corresponding to 22 knots, the speed of the ship, is selected, it being observed that this point falls onto and coincides with the 70° course angle curve of the first family of curves 11. This 70° curve when followed to the periphery 40 of the disc 2 terminates at a point which is opposite a point on the peripheral scale 9 corresponding to 125½°. Thus the problem is solved and the true course of the ship to be steered (Item 3) is 125½°.

*Problem two*

Given: Item 1—Course of guide, 55°, Item 2—Speed of guide, 13 knots, Item 3—Course of ship, 115°, Item 5—Direction of relative movement, 160°. Required: Item 4—Speed of ship. In the solution of this problem, the course of guide line 10' with its arrow is again set at 55° on the peripheral scale 9 to thus fix the true course of the guide; and the large arm 4 with its arrow at its new position or target end is set at 160° on the same peripheral scale to thus definitely fix the direction of relative movement of the maneuvering ship, i. e., the new position sought to be reached by the maneuvering ship. The logarithmic speed scale 20 is then adjusted with a point thereof corresponding to 13 knots, the speed of the guide, so that this point coincides with the speed of guide circle 13. Finally, a point on the peripheral scale 9 corresponding to 115° is chosen and the course angle curve 11 terminating at a point opposite this point is noted. This course angle curve 11 turns out to be the 60° curve. If this curve is now followed inwardly of the disc, that is in a direction toward the speed of guide circle, it will be observed that it intersects the logarithmic speed scale at a point corresponding to a speed of 17¾ knots. The problem is now solved since the speed of 17¾ knots is the required speed of the ship or Item 4.

*Problem three*

Given: Item 1—Course of guide, 55°, Item 2—Speed of guide, 13 knots, Item 5—Direction of relative movement, 160°. Required: Possible combinations of—Item 3—Course of ship, Item 4—Speed of ship—to bring ship to its desired new position. In solving this problem the course of guide line 10', the new position, or target end of the large arm 4 and the logarithmic speed scale 20 are again set at 55°, 160° and at a speed of 13 knots respectively as in the preceding two problems. For any desired speed of the maneuvering ship the operator may immediately determine the true course which he must steer in order to reach his new position. Thus, for example, if he chooses a speed of 18 knots the device gives a true course of 115° which must be steered by the maneuvering ship. If on the other hand a speed of 30 knots is chosen the device immediately gives the solution as 135° to be steered. This problem shows clearly one of the great advantages of my device in that if the course of the guide, speed of the guide and direction of relative movement of the maneuvering vessel are known the tactical officer of the maneuvering vessel may immediately determine possible combinations of the course and speed of his ship if he is to reach his desired destination. Having determined the possible combinations he may choose that combination of course and speed most suited to the conditions at hand.

In addition to solving course and speed problems with and for true courses, my device is also capable of solving this type of problem when relative courses and bearings are given and are desired, i. e., courses and bearings relative to the course of the guide. In the solution of problems involving relative courses and bearings, the lower or transparent disc 1 is not employed. It will be observed that the upper or opaque disc 2 is graduated at its circumference in degrees both to the right and left of the course of guide line 10' from 0 to 180 to thus provide the circumferential or peripheral scale 16; and that each of the curves of the first family 11 terminates at the circumference 40 of the disc 2 in a point which is angularly spaced from the said course of guide line 10' an amount equal to the course angle for which the curve in question is constructed. In the solution of problems involving courses and bearing relative to the course of guide the course of guide line 10' represents the course of the guide (Item 1). The large arm 4 with its arrow at the new position or target end is adjusted until this arrow is set at the direction of relative movement (Item 5) of the maneuvering ship as read on the peripheral scale 16 of the upper or opaque disc 2, i. e., the new position sought to be attained and bearing in a direction away from the operator of the device. A point on the logarithmic speed scale 20 corresponding to the speed of the guide (Item 2) is again brought into coincidence with the speed of guide circle 13 by adjusting the slidable strip 7 and aligning the point chosen with the arrows 21. Finally, a point on the logarithmic speed scale is selected which corresponds to the speed of the ship (Item 4) it being assumed again that the speed of the maneuvering ship does not exceed four times that of the guide. The aforementioned parts of the device are then set for four of the items of the relative movement triangle, namely: Item 1—Course of guide; Item 2—Speed of guide; Item 4—Speed of ship; Item 5—Direction of relative movement. A definite relative movement triangle having been fixed, the problem is solved. By noting the course angle curve on which the last selected point of the logarithmic speed scale falls, the course angle and hence the course of the ship (Item 3) relative to that of the guide is determined which is the solution sought.

A single concrete example of one type of course and speed problem will serve better to illustrate the use of the device when courses and bearings relative to the course of the guide are involved.

*Problem*

Given: Item 1—Course of guide; Item 2—Speed of guide, 16 knots; Item 4—Speed of ship, 21 knots; Item 5—Direction of relative movement, 90°—relative to the course of the guide. Required: Item 3—Course of ship. In the solution of this problem the course of guide line 10' of the upper disc 2 represents the course of the guide. The arm 4 with the arrow at its new position or target end is now adjusted until this arrow is opposite the 90° marking of the peripheral scale 16 on the upper or opaque disc 2. The logarithmic speed scale 20 is then adjusted so that the point thereof corresponding to 16 knots, the speed of the guide, coincides with the speed of guide circle 13. Finally, a point on the logarithmic speed scale corresponding to 21 knots and representing the speed of the ship is selected, it being observed that this point falls on and coincides with the 40° course angle curve of the family of curves 11. The problem is now solved; the course to be steered by the ship (Item 3) is 40° relative to the course of the guide.

*The construction of the second family of curves*

The manner of constructing the second family of curves 12 which represent loci of convenient ratios of the speed of relative movement of the maneuvering ship to the speed of the guide will now be explained. Referring again to the drawings there is shown in Fig. 7 thereof, the graphical method employed for obtaining the data necessary for plotting one of the family of curves 12 which represent loci of convenient ratios of the speed of relative movement of the maneuvering ship to the speed of the guide; and in Fig. 8 the manner of plotting one of the family of curves 12 from the data obtained by the constructions of Fig. 7. The constructions in Figs. 7 and 8 are shown specifically for the family of curves 12 on the front of the device, namely for those cases in which the speed of the maneuvering ship is equal to or greater than the speed of the guide. In brief, there is obtained graphically in Fig. 7 by constructions employing relative movement triangles wherein the ratio of the speed of relative movement of the maneuvering ship to that of the guide is fixed and constant, the directions of relative movement (D. R. M.) of the maneuvering ship for different ratios of the speed of the maneuvering ship to the speed of the guide. The data so obtained are then used in Fig. 8 to plot a curve which represents the locus of a ratio of the speed of relative movement of the maneuvering ship to that of the guide, the curve being plotted by a system of polar coordinates wherein the radial ordinate represents to a convenient scale the ratio of the speed of the maneuvering ship to that of the guide and the angular ordinate the direction of relative movement of the maneuvering ship.

In order to insure a clear understanding of the constructions involved reference is again made to the six elements represented by the relative movement triangle depicted in Fig. 4. In Fig. 7 the side G of the relative movement triangle is fixed in direction and length thus fixing the course (Item 1) and speed (Item 2) of the guide, the side G being chosen of any convenient length. The side R is fixed in length only, thus fixing definitely the speed of relative movement of the maneuvering ship (Item 6) which in this case, for illustrative purposes, is taken as 1.4 times that of the guide. Now for various lengths of S, corresponding to various speeds of the ship (Item 4) and which are either equal to or greater than the length of G, the relative movement triangle is completed by drawing R, thus fixing the direction of relative movement or D. R. M. (Item 5) of the maneuvering ship for any speed thereof.

With a view to facilitating the construction of the various relative movement triangles for various ratios of the speed of the ship to that of the guide, a speed ratio scale 56 is drawn in the direction of the side G of the relative movement triangle, the zero of the scale coinciding with the vertex of the triangle which is opposite the side R thereof. The major divisions or lengths of this scale 56 numbered 1, 2, etc., are multiples of the length of the side G, thus representing speeds 1, 2, etc., times that of the guide. For convenience in construction, each major division of the speed ratio scale 56 is divided into 10 equal parts. Thus, it is evident that any part of the scale 56 may be considered as representing a definite ratio of the speed of the maneuvering ship to that of the guide. An arc 57 is described with its center at 58 and with a radius, which is side R of the relative movement triangle, equal in length to 1.4 times the side G of the relative movement triangle thus forming as pointed out by the legend the relative movement arc for a relative speed 1.4 times that of the guide. The direction of relative movement (D. R. M.) or the direction of the side R of the various triangles is measured by any convenient angular measure clockwise from the course of guide line 59, as shown.

From the graphical constructions in Fig. 7 the following data may be tabulated for use in plotting the curve of Fig. 8. In this data it should be carefully noted that the speed ratio is the ratio of the speed of the maneuvering ship to that of the guide and not the ratio of the speed of relative movement of the maneuvering ship to that of the guide. This latter ratio is fixed and is for the case here illustrated 1.4.

*Data for constant 1.4 ratio of the relative speed of the ship to the speed of the guide*

| Speed ratio | D. R. M. |
|---|---|
| | *Degrees* |
| 1.00 | 135 |
| 1.40 | 110 |
| 1.72 | 90 |
| 2.00 | 67 |
| 2.20 | 50 |
| 2.32 | 30 |
| 2.40 | 0 |

Reference is now made to Fig. 8 of the drawings to show how the data obtained from the graphical constructions of Fig. 7 are utilized in plotting the curve 12 which represents a locus of a predetermined ratio of the speed of relative movement of the maneuvering ship to that of the guide. This figure, like that of Fig. 6, discloses a fragmentary portion of the front side of the upper or opaque disc 2 wherein 39 denotes its center, 13 the speed of guide circle, 10' the course of guide line, and 40 its circumference. The curve of Fig. 8, which is representative of the curves of the second family 12, is plotted in a manner identical with that employed in plotting the curve of Fig. 6, i. e., the curve 12 of Fig. 8 is plotted by a system of polar coordinates, the radial ordinate of which represents the speed ratio or the speed of the maneuvering vessel to that of the guide and the angular ordinate the direction of relative movement (D. R. M.) of the maneuvering ship. The center of the system of polar coordinates coincides with the center 39 of the disc 2.

What was said concerning the measurement of the radial ordinate in connection with the description of Fig. 6 applies with full force and effect in the curve construction of Fig. 8. Furthermore, the compound speed ratio scale 60 in Fig. 8 for measuring the length of the radial ordinates for various speed ratios is identical with that shown in Fig. 6 at 41.

In plotting the curve 12 of Fig. 8 or any curve of the second family 12 the angular ordinates are reckoned right and left from the course of guide line 10' and the radial ordinates are measured to the compound speed scale 60 outwardly from the speed of guide circle 13, the origin of the system of polar coordinates for this purpose coinciding with the center 39 of the disc 2.

In constructing the curve 12 of Fig. 8 from the data appearing on page 8, radial lines 61, 62, 63, 64, 65 and 66 are drawn outwardly from the center 39 of the disc in directions measured angularly from the course of guide line respectively for 135°, 110°, 90°, 67°, 50° and 30°. Since the speed ratio corresponding to a direction of relative movement of 135° is 1.00, the point 67 (1.00, 135°) will fall on the speed of guide circle 13. For determining the point 68 (1.40, 110°) a distance corresponding to the ratio 1.40 is measured along the compound speed ratio scale 60 and the distance so measured laid off along the radial line 62 outwardly from the circumference of the speed of guide circle 13. Points 69, B, 70, 71 and 72 are similarly determined by laying off along their respective radial lines distances outwardly from the speed of guide circle 13 which correspond to their respective speed ratios as measured to the compound speed ratio scale 60. Through the points 67, 68, 69, B, 70, 71 and 72 thus determined a smooth curve 12 is drawn which now represents the locus of a 1.4 ratio of the speed of relative movement of the maneuvering ship to that of the guide. The 1.4 curve of the family 12, as is evident from an inspection of Fig. 1, is symmetrical with respect to the course of guide line 10'. In Fig. 8 only one half of the 1.4 curve is shown, it being evident that the remaining half is constructed in a manner similar to that employed in constructing the portion shown in Fig. 8.

All other curves of the second family 12 are constructed in a manner identical with that shown at Figs. 7 and 8 except that each remaining curve is constructed for a different ratio of the speed of relative movement of the maneuvering ship to that of the guide.

The logarithmic speed scale 20 on the slidable strip 7 (Fig. 1) and the fixed speed ratio scale 18 on the large arm 4 cooperate with the second family of curves 12 in the same manner that they cooperate with the first family of curves 11 previously described herein. Since at least a portion of each curve of the second family of curves 12 is constructed for the logarithm of various ratios of the speed of the maneuvering ship to that of the guide by employment of the logarithmic portion of the compound speed ratio scale 60, the logarithmic speed scale 20 in cooperation with the second family of curves 12, if the speed in knots of the guide and maneuvering ship are given, can determine or fix a definite relative movement triangle and thus effect the solution of a given problem.

*The construction of the ratio scale on the slidable strip and the time scale on the large arm*

Now if the speed of the guide is denoted by G and the speed of the maneuvering ship by S any setting of the logarithmic speed scale 20 to these values will cause the point thereof corresponding to S to fall upon and coincide with a definite curve 12 of the second family. The ratio marked on this curve is the ratio of the speed of relative movement of the maneuvering ship to the speed of the guide or $$\frac{R}{G}$$

Since the speed of the guide is known and is designated by the letter G, the speed R or the speed of relative movement of the maneuvering ship may be quickly obtained by multiplying the ratio read from the curve, namely $$\frac{R}{G}$$

by G. Generally, however, the speed of relative movement of the maneuvering vessel is not wanted but rather the time consumed by the maneuvering vessel in traversing unit distance in its direction of relative movement so as to make possible a quick determination of the time required to complete the maneuver. For attaining this end the remaining portion of the slidable strip 7 is provided with a scale 22 of ratios of the speed of relative movement of the maneuvering ship to the speed of the guide, the ratios of this scale corresponding to and including those used in constructing the various curves of the second family of curves 12. The scale to which these ratios are measured may be any known scale, a purely arbitrary scale or a logarithmic scale employing any convenient base. In the instant case the scale 22 of ratios of the speed of relative movement of the maneuvering ship to the speed of the guide is shown as logarithmic in character since such a scale is much compressed and for the ratios involved gives an overall length of scale which is of convenient size.

Abreast scale 22 and on the large arm 4 there is a time scale 23 which represents the time necessary for the maneuvering ship to traverse unit distance in its direction of relative movement or what is the same thing the time necessary to go unit distance towards its new position. This scale may be constructed for any convenient unit of time in connection with any convenient unit of distance, and is here, for illustrative purposes, shown as a scale in minutes representing the time required for the maneuvering vessel to go one knot in its direction of relative movement. Since for any setting of the speed G of the guide on the speed circle 13 and for any speed S of the maneuvering ship a definite curve of the second family of curves 12 or a definite ratio of $$\frac{R}{G}$$

is determined as previously pointed out, R the speed of relative movement of the maneuvering ship may be quickly determined. R, for illustrative purposes, is expressed in knots per hour which in turn can be expressed in minutes (T) to go one knot in the direction of relative movement. The time T corresponding to the value of $$\frac{R}{G}$$

is placed on the time scale 23 opposite the value of $$\frac{R}{G}$$

on the scale 22 of the slidable strip 7. A similar procedure is adopted for other values of G, S, $$\frac{R}{G}$$

and T thus making possible the construction of the time scale 23. The following concrete examples will serve to better illustrate the construction of the time scale 23.

*Center line of large arm coinciding with the course of guide line*

Speed of guide or G=10 knots.

| S (knots) | $\frac{R}{G}$ | R (knots) | T (minutes) |
|---|---|---|---|
| 13 | 0.3 | 3 | 20 |
| 16 | 0.6 | 6 | 10 |
| 20 | 1.0 | 10 | 6 |

With the aid of the above tabulation it will now be shown how three points on the time scale 23 are determined. With the portion of the center line of the large arm 4 adjacent its new position or target end coinciding with the course of guide line 10' on the disc 2, the logarithmic speed scale 20 is set such that the speed 10 thereof corresponding to the speed of the guide coincides with the speed of guide circle 13. For speeds (S) of 13, 16 and 20 knots of the maneuvering ship on the logarithmic speed scale there are fixed on the opaque disc 2 the 0.3, 0.6 and 1.0 curves of the second family of curves 12. The values of these curves as previously pointed out represent ratios of the speed of relative movement of the maneuvering ship to that of the guide or what is expressed in the preceding table as $$\frac{R}{G}$$

Since the speed of the guide G is given as 10 knots the speed of relative movement R corresponding to the different speeds S of the maneuvering ship may be easily obtained by simply multiplying the various values in the preceding tabulation under $$\frac{R}{G}$$

by 10. This gives the various speeds of relative movement of the maneuvering ship as 3, 6 and 10. It is at once evident that if the speed of relative movement is 3 knots per hour that it will take the vessel under these conditions 20 minutes to traverse one knot in its direction of relative movement. Similarly for relative speeds of 6 and 10 knots per hour the times required to traverse one unit of distance in a direction of relative movement are respectively 10 and 6 minutes. With the logarithmic speed scale 7 in its same position of adjustment, i. e., with the speed of 10 knots coinciding with the speed of guide circle 13, the ratios of $$\frac{R}{G}$$

on the scale 22 of the slidable strip 7 and corresponding to ratios of 0.3, 0.6 and 1.0 are noted. Opposite these observed ratios on the scale 22 there are marked on the time scale 23 the times of 20, 10 and 6, corresponding respectively to the ratios of 0.3, 0.6 and 1.0 on the scale 22. In a similar manner other graduations of the time scale 23 may be determined thus making possible a completion of the scale.

*The solution of time and distance problems*

At this point the manner of using the device in the solution of time and distance problems will be set forth. It will be remembered that this type of problem is merely the course and speed problem with the added problem of finding the time required for the completion of the maneuver and occasionally the distance which the ship travels during the maneuver. When the time required to complete the maneuver is required this device better than the mooring board lends itself to direct reading solutions and to the study of times which would be required for different maneuvers under consideration. In destroyers it was found useful when proceeding to a station in a fleet disposition where the position to be reached was better located by the time to reach it than by any available bearings or ranges. It is also convenient in choosing a course and speed combination where one is required to reach the new position by a certain time. In order to insure a clear understanding of the solution of this type of problem reference must again be made to the six elements represented by the relative movement triangle as previously set forth.

Time and distance problems occur most frequently in the form: Known: Item 1—Course of of guide; Item 2—Speed of guide; Item 4—Speed of ship; Item 5—Direction of relative movement and distance of new position from position of maneuvering ship. Required: Item 3—Course of ship and time to complete maneuver. This type of problem can be solved with my device for either true courses or courses relative to the guide. Its solution for true courses, however, will only be explained since the use of the device with courses relative to the guide has been discussed previously herein.

With the true course of the guide given (Item 1) the arrow of the course of guide line 10' on the upper disc 2 is set to the true course on the peripheral scale 9 of the lower or transparent disc 1. The large arm 4 with its arrow at the new position or target end is adjusted until the arrow is set at the true direction of relative movement (Item 5) as read on the peripheral scale 9 of the larger disc, this true direction of relative movement being identical with that which the new position bears from the operator of the device. The point on the logarithmic speed scale 20 corresponding to the speed of the guide (Item 2) is placed in a position to coincide with the speed of guide circle 13 by adjusting the slidable strip 7 and aligning the aforesaid point with the arrows 21. The last step in setting the component parts of the device for the given problem consists in choosing a point on the logarithmic speed scale 20 which corresponds to the speed of the maneuvering ship (Item 4) it being assumed for this particular problem that the speed of the maneuvering ship does not exceed four times that of the guide. All component parts of the device having been set for four of the items of the relative movement triangle, namely; Item 1—Course of guide; Item 2—Speed of guide; Item 4—Speed of ship; Item 5—Direction of relative movement, a triangle is now fixed or determined and the problem is solved, it being only necessary to read the desired solutions from the device.

The last point chosen on the logarithmic speed scale, namely, that corresponding to the speed of the ship (Item 4), will fall onto and coincide with two curves, the first curve of which is one of the family of curves 11 representing course angles of the maneuvering ship with respect to the guide; and the second curve of which is one of a family of curves 12 representing loci of convenient ratios of the speed of relative movement of the maneuvering ship to that of the guide. The first curve 11 gives the course angle for the relative movement triangle fixed by the aforesaid Items 1, 2, 4 and 5. By following the curve 11 outwardly along the upper disc 2 to its circumference 40 the true course of the maneuvering ship (Item 3) may be read on the peripheral scale 9 of the lower or transparent disc 1. The ratio which the second curve 12 represents is now noted. Abreast this ratio on the scale 22 of ratios of the speed of relative movement of the maneuvering ship to the speed of the guide, the time required to traverse a unit of distance in the direction of relative movement is noted on the time scale 23. Since the distance of the new position from the maneuvering ship is known it remains only to multiply this distance by the time required to traverse unit distance to thus determine the time required to complete the maneuver.

To further illustrate the solution of this type of problem involving true course the following specific example is given; Known: Item 1—Course of guide, 320°; Item 2—Speed of guide, 11 knots; Item 4—Speed of ship, 20 knots; Item 5—Direction of relative movement, 56° and distance of new position from position of maneuvering ship, 7 miles. Required: Item 3—Course of ship and time to complete maneuver. In the solution of this problem the course of guide line 10' is set at 320° on the peripheral scale 9 of the lower or transparent disc 1; and the large arm 4 with the arrow at its new position or target end is set to coincide with the mark on the same peripheral scale corresponding to 56° and representing the direction of relative movement of the maneuvering ship. The slidable strip 7 is then adjusted so that the point thereof corresponding to 11 knots, the speed of the guide, coincides with the speed of guide circle 13. Finally, another point on the logarithmic speed scale corresponding to 20 knots and representing the speed of the ship is selected to thereby fix two curves 11 and 12 representing, respectively, the course angle of the desired relative movement triangle and the ratio of the speed of relative movement of the maneuvering ship to that of the guide for this particular problem. The problem is now solved and it remains only to read the desired solutions from the device. The curve 11 of the first family of curves fixed by the speed of 20 knots on the logarithmic speed scale is the 62° course angle curve. If this curve is now followed outwardly to the periphery of the disc 2 it will be found that it terminates at a point opposite the 22° mark on the peripheral scale 9 of the lower disc 1. Thus one part of the solution to the problem is immediately obtained since the 22° mark on the peripheral scale 9 is the course of the ship (Item 3) which must be steered if the new position is to be reached. The curve 12 of the second family of curves fixed by the speed of 20 knots on the logarithmic speed scale 20 is the 1.6 curve. Abreast the graduation of 1.6 on the ratio scale 22 of the slidable strip 7 there will be found a reading of 3.3 minutes on the time scale 23 which represents the time necessary for the maneuvering ship to traverse one mile in its direction of relative movement. Since the distance of the new position from the position of the maneuvering ship is given as 7 miles the time necessary to complete the maneuver is quickly and readily obtained by merely multiplying the time to traverse unit distance, namely 3.3 minutes, by the distance of 7 miles. This gives as the second and required part of the solution of the problem a time of approximately 23 minutes, which is the time necessary to complete the maneuver.

*Further details concerning the construction and use of the back of the device*

The back of the device as pointed out hereinbefore is used in the solution of problems wherein the speed of the maneuvering ship is less than the speed of the guide. In such cases there are two solutions for each problem, the large course angle and the small course angle solutions. In order to make possible the solution of such problems the two areas of curves 27 and 28 (Fig. 2) are provided, the outer area 27 being used for large course angle solutions and the inner area 28 for small course angle solutions. The small arm 3, it will be remembered, carries the two identical speed ratio scales 35 and 36 for cooperation with the inner and outer curve areas 28 and 27 respectively. The ratios of each of the scales 35 and 36, which represent ratios of the speed of the maneuvering ship to that of the guide, are measured to a purely arbitrary but uniform scale which is also used in determining the length of the radial ordinate of a system of polar coordinates used in plotting each of the families of curves 29 and 30 of the outer and inner curve areas 27 and 28. Each of the curve areas 27 and 28 consists of the two families of curves 29 and 30, the first family 29 of which represents course angles of the maneuvering ship with respect to the guide; and the second family 30 of which loci of convenient ratios of the relative speed of the maneuvering ship to the speed of the guide. The graphical methods employed for obtaining the data necessary in plotting the first and second families of curves 29 and 30 are identical with those depicted in Figs. 5 and 7 respectively, except that the ratios of the speed of the maneuvering ship to the speed of the guide in all cases are either equal to or less than unity. After the data have been obtained curves are plotted for each family by employing a system of polar coordinates wherein the radial ordinate represents to the scale previously noted the ratio of the speed of the maneuvering ship to that of the guide and the angular ordinate the direction of relative movement.

The origin of the system of polar coordinates is at the center 39 of the disc 2, the angular ordinate thereof being reckoned right and left from the course of guide line 31 (Fig. 2). The radial ordinates of the outer and inner curve areas 27 and 28, although measured with identical scales, are laid off differently. The radial ordinate for the inner area of curves 28 is laid off from the origin 39 of the system of polar coordinates while the radial ordinate of the outer area 27 extends from the arc 73 outwardly.

Course and speed, as well as time and distance problems involving either true courses or courses relative to the guide, may be solved with this side of the device, each problem being solved simultaneously for the large and small course angles. In the solution of such problems involving true courses the center line 31 with its arrow or the course of guide line on the smaller disc 2 is set to the guide's true course on the peripheral scale 10 of the lower or transparent disc 1; and the center line 33 of the arm 3 is pointed in the direction of relative movement, i. e., the true bearing of the new position as read on the same peripheral scale 10 on the lower disc 1. Any value of the speed ratio on the arm 3, i. e., the ratio of the speed of the maneuvering ship to that of the guide, read against the first family of curves 29 of the outer and inner curved areas 27 and 28 gives respectively the required large and small course angle solutions. These course angles on the course angle scale 32 at the outer edge or circumference of the smaller disc 2 when read against the true or peripheral scale 10 of the larger disc 1, give the true courses to be steered.

In order to obtain the times for the maneuvering ship to go one unit in its direction of relative movement for the large and small course angle solutions, the curve of the second family of curves 30 in each curve area 27 and 28 coinciding with the selected speed ratio on the small arm 3 is noted. The ratio values read from these curves 30 are used on the front of the device by setting the slidable logarithmic speed scale 20 with the speed of the guide between the arrows 21 and reading these ratio values on the ratio scale 22 against the time scale 23 to obtain the necessary times for traversing a unit of distance in the directions of relative movement for the large and small course angle solutions.

The following concrete problem illustrates further the use of the back of my device for solving problems in which the speed of the maneuvering vessel is less than that of the guide. The problem which will now be worked out in detail is one involving true courses and bearings, it being evident, however, that the back of the device may also be used in the solution of problems wherein the courses and bearings are given as courses and bearings relative to the guide.

Problem

Given: Item 1—Course of guide, 50°; Item 2—Speed of guide, 10 knots (standard speed); Item 4—Speed of ship, ⅔ standard speed; Item 5—Direction of relative movement, 210°. Required: Item 3—Course of ship: (a) Large angle solution; (b) Small angle solution; (c) T1, for large angle solution; and (d) T2, small angle solution. In the solution of this problem the course of guide line 31 is set with its arrow at 50° on the peripheral scale 10 of the lower or transparent disc 1. The small arm 3 is then adjusted so that the arrow adjacent the legend "New position" is opposite the 210° marking on the same peripheral scale 10. Finally the ⅔ point on each of the speed ratio scales 35 and 36 is selected and the curves 29 of the first family of curves fixed by these points in the areas 27 and 28 are noted. The course angle curve 29 in the first area of curves 27 turns out to be the 129° curve; and the course angle curve 29 in the second area of curves 28 is the 11° curve. Thus, the large course angle and small course angle solutions are 129° and 11° to the right respectively. In order now to determine the true course to be steered by the ship for the large and small course angle solutions it is necessary to note the readings on the peripheral scale 10 corresponding to the large and small course angles as read on the course angle scale 32 on the opaque disc 2. With the component parts of the device in their positions of adjustment for this problem, it is noted that the true courses to be steered for the large and small course angle solutions of 129° and 11° are 179° and 61° respectively (Item 3). The curves 30 of the second family of curves fixed by the ⅔ point on the speed ratio scales 36 and 35 are the 1.5 curve in the outer area of curves 27 and the 0.35 curve in the inner area of curves 28. In order now to determine the time required for the maneuvering vessel to traverse one unit of distance in its directions of relative movement for the large and small course angle solutions of this problem, it is necessary to refer to the front side of the device. With the logarithmic speed scale 20 adjusted such that the point thereof corresponding to a speed of 10 knots, the speed of the guide, coincides with the speed of guide circle 13, the readings on the time scale 23 corresponding to ratios of 1.5 and 0.35 on the ratio scale 22 are noted. The readings on the time scale 23 for these ratios turns out to be T1 (large course angle solution) equal to 4 minutes and T2 (small course angle solution) equal to 18 minutes. If now the distance of the new position from the position of the maneuvering ship is given, since T1 and T2 are known, it becomes a relatively simple matter to compute the times necessary to complete the maneuver for the large and small course angle solutions.

Torpedo fire

In addition to solving problems for maneuvering ships, the device is also designed to furnish prompt, accurate and continuous solutions for the problems of torpedo fire, particularly as encountered on destroyers. The device enables the division commander to work his own problems; and to obtain, among other things, continuous and direct reading information concerning limiting range and ratio of run to range which is not otherwise readily available.

These torpedo problems will be more readily understood if it is remembered that the problem of maneuvering a ship and of directing a torpedo are basically identical. The torpedo may be considered as a ship of predetermined speed and limited range which it is desired to launch in a direction such that its movement relative to the target is identical with the bearing of the target ship from the firing ship. At times the converse problem is presented as when a ship which is threatened with a torpedo attack will wish to quickly solve the torpedo fire problem of the attacking vessel, in order to determine whether or not the hostile vessel is within attacking range; and if so what maneuver the threatened ship should perform in order to place the hostile vessel out of attacking range.

The front of my device is used in the solution of problems involving torpedo fire. Before proceeding with a detailed discussion of the use of the device in the solution of torpedo problems, it is necessary at this point to define the technical term "target angle", a scale 14 for which appears as a 360° scale on the front side of the upper disc 2 just within the speed of guide or target circle 13.

*Target angle*—This angle is the relative bearing of the firing ship from the target ship measured in degrees or any other convenient unit from the target ship's head to the right or clockwise.

For torpedo problems the relative movement triangle of Fig. 4 is interpreted as follows:

Side G—Target side: Item 1—Course of target; Item 2—Speed of target.

Side S—Torpedo side: Item 3—Course of torpedo; Item 4—Speed of torpedo.

Side R—Relative movement side of torpedo:— Item 5—Direction of relative movement of torpedo; Item 6—Speed of relative movement of torpedo.

*The solution of torpedo course and speed problems*

In using the device to direct torpedo fire the torpedo course and speed problem frequently occurs in the form: Known: Item 1—Course of target; Item 2—Speed of target; Item 4—Speed of torpedo; Item 5—Direction of relative movement of torpedo. Required: Item 3—Course of torpedo.

This type of problem can be solved for either true courses or courses relative to the target. Its solution for true courses alone will be explained since thereafter the solution with relative courses, it is believed, will be self-evident.

With the true course of the target given (Item 1) the arrow of the course of guide or target line 10' on the smaller disc 2 is set to the true course on the peripheral scale 9 of the lower or transparent disc 1. The large arm 4 with its arrow at the new position or target end is adjusted until the arrow is set at the true direction of relative movement of the torpedo (Item 5) as read on the peripheral scale 9 of the large disc, i. e., the large arm 4 is set in the direction of the target to be struck, the target bearing in a direction away from the operator of the device. A point on the logarithmic speed scale 20 corresponding to the speed of the target (Item 2) is now brought into coincidence with the speed of guide or target circle 13 by adjusting the slidable strip 7 and aligning the point so chosen with the arrows 21. Finally, a point on the logarithmic speed scale is selected which corresponds to the speed of the torpedo (Item 4), it being assumed for this particular problem that the speed of the torpedo does not exceed four times that of the target. Having set the component parts of the device for four of the items of the relative movement triangle—Item 1—Course of target; Item 2—Speed of target; Item 4—Speed of torpedo; Item 5—Direction of relative movement of torpedo—a definite relative movement triangle is fixed or determined and the problem is solved, it being only necessary to read the solution from the device. If the true course of the target is not known but instead the target angle, this angle on the scale 14, is brought into coincidence with the line 19 of the logarithmic speed scale 20.

The last point selected on the logarithmic speed scale 20, namely that corresponding to the speed of the torpedo (Item 4), falls onto and coincides with one of the curves 11 of the first family of curves which may now be interpreted as representing course angles of the torpedo with respect to the target. The curve 11 thus determined immediately gives the course angle for the relative movement triangle fixed by the aforesaid Items 1, 2, 4 and 5. This curve is now followed outwardly along the upper disc 2 to its circumference where the true course of the torpedo (Item 3) may be read on the peripheral scale 9 of the lower The following specific example involving true courses illustrates further this type of torpedo problem in which the true collision course of the torpedo is desired. Given: Item 1—Course of target, 226°; Item 2—Speed of target, 15 knots; Item 4—Speed of torpedo, 27 knots; Item 5—Direction of relative movement of torpedo, 142°. Required: Item 3—Course of torpedo.

In the solution of this problem the course of guide or target line 10' is set to 226° on the peripheral scale 9 of the lower transparent disc 1 and the arm 4 is adjusted with its new position or target end to coincide with the 142° marking on the same peripheral scale. The logarithmic speed scale 20 is then adjusted so that the point thereof corresponding to 15 knots, the speed of the target, coincides with the speed of guide or target circle 13. Finally a point on the logarithmic speed scale 20 is selected which corresponds to the speed of 27 knots of the torpedo this point falling on and coinciding with the 50° course angle curve of the family of curves 11. If this 50° course angle curve is now followed outwardly to the periphery of the disc 2 it will be found to terminate at a point opposite the 176° graduation on the peripheral scale 9. The problem is now solved, it being clear that the course along which the torpedo must run, if it is to strike the target, must be 176° true.

*Maximum firing ranges and ratios of run to range*

In torpedo work with a torpedo of certain speed and maximum distance of travel or run, it is often necessary to know what the maximum firing range or maximum distance of relative movement of the torpedo with respect to the target will be, as well as the ratio of the torpedo run to the range under different operating conditions. The importance of being able to quickly determine the maximum firing range of a torpedo of given rating for various tactical problems cannot be over estimated since it permits a launching of the torpedo at a maximum range from the enemy vessel with the assurance that the torpedo run is sufficient to insure the same reaching its objective. If now any relative movement triangle is fixed for a torpedo-target problem, (1) the ratio of the speed of relative movement of the torpedo to the speed of the target is known as well as (2) the ratio of the actual speed of the torpedo to that of the target. The distance that the torpedo moves in its direction of relative movement relatively to the target, i. e., its firing range, is proportional to the first mentioned speed ratio and the distance that the torpedo actually travels along its course or its run is proportional to the previously mentioned second speed ratio. Thus if the maximum run of the torpedo is denoted by D and the maximum firing range by F then $$F = D \times \frac{\text{first speed ratio}}{\text{second speed ratio}}$$

The large arm 4 is provided with two torpedo scales 24 and 25, scale 24 being one for maximum firing ranges and scale 25 for ratios of run to firing range. Each of the scales 24 and 25 is constructed for 15,000-yard, 27-knot torpedoes.

*The construction of the torpedo scales*

The construction of the torpedo scales will tabulation based on 15,000-yard, 27-knot torpedoes with an assumed target speed of 9 knots.

| D. R. M. (relative) | First speed ratio | Second speed ratio | Max. firing range (yards) | Run (range) |
|---|---|---|---|---|
| 170° | 4 | 3 | 20,000 | 0.75 |
| 100° | 3 | 3 | 15,000 | 1.00 |
| 0° | 2 | 3 | 10,000 | 1.50 |

In the preceding tabulation the direction of relative movement of the torpedo with respect to the target (D. R. M.) is given in degrees relative to the course of the target and hence is measured on the circumferential scale 16 on the upper or opaque disc 2. The first and second speed ratios represent, respectively, the ratio of the speed of relative movement of the torpedo to that of the target and the ratio of the actual speed of the torpedo to that of the target. This latter ratio is of course three since the torpedo speed is given as 27 knots and the tabulation is for an assumed target speed of 9 knots. With the large arm 4 set to the 170° mark on the circumferential scale 16 of the upper or opaque disc and the logarithmic speed scale 20 adjusted such that the 9-knot joint thereof coincides with the speed of guide or target circle 13, the point of the logarithmic speed scale corresponding to a speed of 27 knots is noted, this latter point coinciding with the 4-ratio curve 12 of the second family of curves. Thus for this setting of the device the relative movement triangle fixed thereby is one in which the first speed ratio, namely, the speed of relative movement of the torpedo to that of the target, is 4. Since the first and second speed ratios are now determined as 4 and 3 respectively, the maximum firing range for the 15,000-yard torpedo is easily determined by the formula previously set forth herein, namely:

$$F = D \times \frac{\text{first speed ratio}}{\text{second speed ratio}}$$

Substituting in this formula the foregoing values, the maximum firing range is determined as 20,000 yards. The ratio of run to range is then 0.75. In a similar manner for D. R. M.'s 100° and 0° the preceding tabulation is completed.

Abreast the first speed ratios of 4, 3, and 2 on the ratio scale 22 of the slidable strip 7 and with the 9-knot point of the speed scale 20 coinciding with the speed of guide or target circle 13, there are marked on the torpedo scale 24 the maximum firing ranges of 20,000, 15,000 and 10,000 yards corresponding to these ratios. Similarly the ratios of run to range, namely, 0.75, 1.00 and 1.50 are marked on the second torpedo scale 25 abreast their respective first speed ratios on the ratio scale 22 of the slidable strip 7. A similar procedure is adopted for other values of D. R. M. and first and second speed ratios, the rating of the torpedo remaining constant. While the torpedo scales 24 and 25 have been shown as established for 15,000-yard 27-knot torpedoes, I do not desire to be restricted thereto, since scales of this type, if desired, may be constructed for any other torpedo rating.

*The solution of maximum firing range and ratio of run to range torpedo problems*

If now it is desired to determine the maximum firing range and ratio of torpedo run to firing range for any given setting of the component parts of the device, it is necessary to observe which curve 12 of the second family of curves coincides with or is fixed by the point on the logarithmic speed scale 20 which represents the speed of the torpedo or item 4 of the relative movement triangle. This second family of curves 12 may now be interpreted as representing loci of convenient ratios of the speed of relative movement of the torpedo to that of the target. This speed ratio, namely, the first ratio of the preceding torpedo tabulation, represented by the curve 12 and fixed by the aforesaid point is read on the ratio scale 22 of the slidable strip 7 against the torpedo scales 24 and 25 which are abreast thereof thus determining the maximum firing range and ratio of run to range for this particular setting of the component parts of the device.

The determination of maximum firing range and ratios of run to range may be further illustrated by considering again the previous torpedo problem worked herein and appearing on page 13.

*Problem*

Given: Item 1—Course of target, 226°; Item 2—Speed of target, 15 knots; Item 4—Speed of torpedo, 27 knots; Item 5—Direction of relative movement of torpedo, 142°. Required: Item 3—Course of torpedo and (a) Maximum firing range, (b) Ratio run to range. The collision course upon which the torpedo must run for the data of this problem was previously determined as 176° true. The curve of the second family of curves 12 fixed by the 27-knot point of the speed ratio scale 20 is the 1.4 curve. With the 15-knot point of the logarithmic speed scale 20 coinciding with the speed of guide or target circle 13 the readings of the two torpedo scales 24 and 25 are noted which are abreast the 1.4 marking on the ratio scale 22. This gives a maximum firing range of 11,500 yards and a ratio of run to range of 1.3 which are the required solutions (a) and (b) sought.

*Torpedo evading problems*

It may happen that a ship threatened with a torpedo attack will wish to solve the torpedo fire problem of attacking destroyers in order to determine whether or not the destroyers are in attacking range, and if so what maneuver the threatened ship should execute in order to place it out of attacking range. This type of problem is properly termed a torpedo evading problem and is one of the more complicated of the composite relative movement problems. A concrete example of this type of problem will serve to illustrate the manner of using the device of my invention in the solution thereof.

*Problem*

A battleship division proceeding at a speed of 16 knots sights a squadron of enemy destroyers on a relative bearing of 285° at a range of 12,000 yards. The torpedoes of the enemy are known to have a speed of 27 knots and a maximum run of 15,000 yards. It is desired to determine whether or not the enemy destroyers offer a threat. This problem is solved as a torpedo firing problem of the attacking destroyers, the battleship division representing the target and the relative bearing the target angle. The data of this problem may be tabulated as follows: Given: Item 1—Course of target; Item 5—Torpedo direction of relative movement (target angle 285°); Item 2—Speed of target, 16 knots; Item 4—Speed of torpedo, 27 knots. Required: Maximum firing range.

In the solution of this problem the arm 4 is adjusted to the position where the line 19 of the logarithmic speed ratio scale 20 coincides with the 285° graduation of the target angle scale 14. The logarithmic speed ratio scale 20 is then positioned such that the point thereof corresponding to 16 knots, the speed of target, is super-imposed upon the speed of guide or target circle 13. The 27-knot point of the logarithmic speed scale 20 then fixes the 1.6 curve of the second family of curves 12. If the 1.6 ratio is now selected on the ratio scale 22 of the slidable strip 7 there will appear abreast this point on the torpedo scale 24 a range of 14,000 yards which represents the maximum firing range of the enemy destroyers for the given problem. Since the destroyers are at a range of 12,000 yards and their maximum firing range under the conditions stated is 14,000 yards it is evident that the battleship division is threatened. If now the course of the division is changed so that the maximum firing range of the enemy torpedoes will be equal to the destroyer range of 12,000 yards the division will be out of danger. This is quickly accomplished by noting the ratio on the ratio scale 22 opposite the 12,000 yard graduation on the maximum firing range torpedo scale 24 with the 16-knot point of the speed ratio scale 20 still coinciding with the speed of guide or target circle 13. This ratio turns out to be 1.4. Now the arm 4 is pivoted until the reading of 27 knots on the speed ratio scale 20 falls on the curve 12 of the second family of curves bearing the ratio mark 1.4. In this latter setting of the arm 4 the target angle as read on the scale 14 is 273°. Thus the destroyers may be quickly put out of range by changing the course of the battleship division to a target angle or relative bearing of 273° instead of the previous 285°. This is accomplished by changing the course of the battleship division 12° to the right of its initial course.

Incidental features of the device

As pointed out hereinbefore the new position sought to be reached, if it is to be used in the device of my invention, must be given in direction and/or distance bearing from the maneuvering ship and not from the guide. In the majority of cases the bearing and direction of the new position from the maneuvering ship are either known or readily observed. Where they are not known, however, the use of the present device to obtain the bearing and distance of the new position from the maneuvering ship, knowing the present position of the maneuvering ship and its new position from the guide, is interesting as indicating the scope of the device; but it is not considered more convenient than plotting except possibly when changing bearing without changing distance. In working all such problems it should be remembered that after the direction of the new position has been obtained the disc 2 and logarithmic speed scale 20 must be set respectively to the course and speed of the guide before solving for the course and speed of the maneuvering ship in order that it may reach its new position. The following examples are given to illustrate the manner of using the device of my invention for solving problems of the type discussed in this paragraph.

Problem one

The bearing of the maneuvering ship from the guide is given as 70°. Orders are received to change the bearing of the maneuvering ship to a bearing of 110° from the guide. What is the direction of the new position from the maneuvering ship?

In the solution of this problem the course of guide line 10' (Fig. 1) is set at 70° on the peripheral scale 9 of the lower disc 1. The curve 11 of the first family of curves terminating at a point opposite the 110° graduation on the lower scale 9 is followed inwardly to the point where it intersects the speed of guide or target circle 13. The line 19 of the logarithmic speed scale 20 is then brought into coincidence with this latter point thus fixing the direction of the new position from the maneuvering ship. This new position as read on the peripheral scale 9 opposite the arrow of line 15 on the large arm 4 is 180°.

Problem two

The present position of the maneuvering ship is given as 130°, 6,600 yards from the guide and the new position which the maneuvering ship is to take is given as 80°, 12,000 yards from the guide. The distance of the new position and its direction from the maneuvering ship are required.

In solving this problem the course of guide line 10' is set to the 130° graduation on the peripheral scale 9 of the lower disc 1. The logarithmic speed scale 20 is adjusted so that the point thereof corresponding to 6.6 falls on the speed of guide or target circle 13. The 80° graduation on the peripheral scale 9 of the lower disc is now selected and the curve 11 of the first family of curves which terminates at this graduation is noted. This curve is the 50° course angle curve. The arm 4 is now rotated about its pivotal point until the point of the logarithmic speed scale corresponding to the numeral 12 coincides with the 50° course angle curve. The arm 4 now points to 47° as read on the peripheral scale 9 which represents the direction of the new position from the maneuvering ship.

It will be observed that the curve 12 of the second family of curves fixed by the point corresponding to the numeral 12 on the logarithmic speed scale is the 1.4 curve. The distance of the new position from the maneuvering ship is now quickly obtained by multiplying 6,600 yards by this ratio of 1.4 thus giving 9,440 yards as the desired distance.

While the foregoing device of my invention has been described as one adapted for solving certain tactical problems of naval vessels it is evident that with a slight change it might be advantageously used for the solution of relative movement problems involving maneuvers between aircraft. This change would not necessitate any modification in the basic design of my device described in detail hereinbefore, but would only require that the design take into consideration the different speeds encountered in aerial maneuvers. It should also be noted that at least a part of my device has applications which are neither military nor naval in character in that it may be used in the commercial field to determine speed and courses to be steered by vessels in order to avoid collision with another vessel or vessels. Other commercial uses of my device will readily suggest themselves to those skilled in the art.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A device for solving relative movement problems comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which represents the ratio of the speed of the second object to that of the first object and the angular ordinate the direction of relative movement of the second object, a second member movably mounted on said first mentioned member for cooperation with the curves thereof and provided with a series of markings which represent various ratios of the speed of the second object to that of the first, the said markings being placed on said second mentioned member with a scale equal to that used in determining the length of the radial ordinate of the system of polar coordinates.

2. A device for solving relative movement problems comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which represents the ratio of the speed of the second object to that of the first object and the angular ordinate the direction of relative movement of the second object, a second member movably mounted on said first mentioned member for cooperation with the curves thereof and provided with a series of markings which represent various ratios of the speed of the second object to that of the first, the said markings being placed on said second mentioned member with a scale equal to that used in determining the length of the radial ordinate of the system of polar coordinates, and each of said curves terminating outwardly at a point which is angularly spaced from the said line an amount equal in value to the course angle for which the curve is constructed.

3. A device for solving relative movement problems, comprising in combination a disc provided with a line and a family of curves symmetrically arranged with respect thereto, the said line extending in the direction of a diameter of the disc and representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which represents the ratio of the speed of the second object to that of the first object and the angular ordinate the direction of relative movement of the second object, an arm pivotally mounted on said disc at its center for cooperation with the curves thereof and provided with a series of markings which represent various ratios of the speed of the second object to that of the first, the said markings being placed on said arm with a scale equal to that used in determining the length of the radial ordinate of the system of polar coordinates and each of said curves terminating at the periphery of the disc in a point which is angularly spaced from the aforementioned line an amount equal in value to the course angle for which the curve is constructed.

4. A device for solving relative movement problems, comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of relative movement of the second object, a second member movably mounted on said first mentioned member for cooperation with the curves thereof and provided with a series of markings which represent various ratios of the speed of the second object to that of the first, the said markings being placed on said second mentioned member with a scale equal to that used in determining the length of the radial ordinate of the system of polar coordinates.

5. A device for solving relative movement problems, comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of the relative movement of the second object, a second member movably mounted on said first mentioned member and supporting a slidable, logarithmic means cooperating with the family of curves for determining the ratio of the speed of the second object to that of the first object when their speeds are given.

6. A device for solving relative movement problems, comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of the relative movement of the second object, a second member movably mounted on said first mentioned member and supporting a slidable, logarithmic speed scale for cooperation with the family of curves.

7. A device for solving relative movement problems, comprising in combination a disc provided with a line and a family of curves symmetrically arranged with respect thereto, the said line extending in the direction of a diameter of the disc and representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of relative movement of the second object, an arm pivotally mounted on said disc at its center and supporting a slidable, logarithmic speed scale for cooperation with the family of curves, each of said curves terminating at the periphery of the disc in a point which is angularly spaced from the aforementioned line an amount equal in value to the course angle for which the curve is constructed.

8. A device for solving relative movement problems, comprising in combination a disc provided with a line and a family of curves extending from the periphery of the disc to a speed circle whose center is coincident with that of the disc, the said line extending in the direction of a diameter of the disc and representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of the relative movement of the second object, an arm pivotally mounted on said disc at its center, said arm supporting a slidable, logarithmic speed scale for cooperation with the speed circle and the family of curves.

9. A device for solving relative movement problems, comprising in combination a disc provided with a line and a family of curves extending from the periphery of the disc to a speed circle whose center is coincident with that of the disc, the said line extending in the direction of a diameter of the disc and representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of the relative movement of the second object, an arm pivotally mounted on said disc at its center, said arm supporting a slidable, logarithmic speed scale for cooperation with the speed circle and the family of curves, each of said curves terminating at the periphery of the disc in a point which is angularly spaced from the aforementioned line an amount equal in value to the course angle for which the curve is constructed, and a second disc which at its center is pivotally secured to the center of the first mentioned disc, said second mentioned disc being provided with suitable markings at its periphery for cooperation with the line on the first mentioned disc and the arm associated therewith to thus enable the solution of relative movement problems involving true courses.

10. A device for solving relative movement problems, comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which represents the ratio of the speed of the second object to that of the first object and the angular ordinate the direction of relative movement of the second object, a second member movably mounted on said first mentioned member for cooperation with the curves thereof and provided with a series of markings which represent various ratios of the speed of the second object to that of the first, the said markings being placed on said second mentioned member with a scale equal to that used in determining the length of the radial ordinate of the system of polar coordinates, and a third member movably associated with said first and second mentioned members, said third mentioned member being provided with suitable markings for cooperation with the second mentioned member and the line on the first mentioned member to thus enable the solution of relative movement problems involving true courses.

11. A device for solving relative movement problems, comprising in combination a member provided with a line and a family of curves, the direction of the said line representing the course of a moving object relatively to which a second object is to move and the curves representing course angles of the second object with respect to the first, each of said curves being constructed for a predetermined course angle and various ratios of the speed of the second object to that of the first by a system of polar coordinates, the radial ordinate of which, for at least a portion of each curve, is measured to a logarithmic scale and represents the ratio of the speed of the second object to that of the first object and the angular ordinate the direction of the relative movement of the second object, a second member movably mounted on said first mentioned member and supporting a slidable, logarithmic speed scale for cooperation with the family of curves, and a third member movably associated with said first and second mentioned members, said third mentioned member being provided with suitable markings for cooperation with the second mentioned member and the line on the first mentioned member to thus enable the solution of relative movement problems involving true courses.

12. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which represents the ratio of the actual speed of the second object to the actual speed of the first object and the angular ordinate the direction of relative movement of the second object, a second member movably mounted on said first mentioned member for cooperation with the curves thereof and provided with a series of markings which represent various ratios of the actual speed of the second object to that of the first, the said markings being placed on said second mentioned member with a scale equal to that used in determining the length of the radial ordinate of the system of polar coordinates.

13. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably mounted on said first mentioned member for cooperation with the curves thereof and provided with a series of markings which represent various ratios of the actual speed of the second object to that of the first, the said markings being placed on said second mentioned member with a scale equal to that used in determining the length of the radial ordinate of the system of polar coordinates.

14. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably mounted on said first mentioned member and supporting a slidable, logarithmic speed scale for cooperation with the family of curves.

15. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which represents the ratio of the actual speed of the second object to the actual speed of the first object and the angular ordinate the direction of relative movement of the second object, a second member movably mounted on said first mentioned member for cooperation with the curves thereof and provided with a series of markings which represent various ratios of the actual speed of the second object to that of the first, the said markings being placed on said second mentioned member with a scale equal to that used in determining the length of the radial ordinate of the system of polar coordinates, and a third member movably associated with said first and second mentioned members, said third mentioned member being provided with suitable markings for cooperation with the second mentioned member and the line on the first mentioned member to thus enable the solution of relative movement problems involving true courses.

16. A device for solving relative movement problems, comprising in combination a disc provided with a line, a family of curves and a speed circle whose center is coincident with that of the disc, the said line extending in the direction of a diameter of the disc and representing the course of a moving object relatively to which a second object is to move and the curves representing loci of the ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, an arm pivotally mounted on said disc at its center, said arm supporting a slidable, logarithmic speed scale for cooperation with the speed circle and the family of curves.

17. A device for solving relative movement problems, comprising in combination a disc provided with a line, a family of curves and a speed circle whose center is coincident with that of the disc, the said line extending in the direction of a diameter of the disc and representing the course of a moving object relatively to which a second object is to move and the curves representing loci of the ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, an arm pivotally mounted on said disc at its center, said arm supporting a slidable, logarithmic speed scale for cooperation with the speed circle and the family of curves, and a second disc which at its center is pivotally secured to the center of the first mentioned disc, said second mentioned disc being provided with suitable markings at its periphery for cooperation with the line on the first mentioned disc and the arm associated therewith to thus enable the solution of relative movement problems involving true courses.

18. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale for cooperation with a scale on the second mentioned member for determining the time necessary for the second object to traverse a unit of distance in its direction of relative movement.

19. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale of ratios of the speed of relative movement of the second object to the actual speed of the first object, said last mentioned scale being designed for cooperation with a scale on the second mentioned member which represents the time necessary for the second object to traverse a unit of distance in its direction of relative movement.

20. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with second mentioned member, said third mentioned member being provided with a logarithmic speed scale for cooperation with the family of curves and with a logarithmic scale of ratios of the speed of relative movement of the second object to the actual speed of the first object, said last mentioned scale being designed for cooperation with a scale on the second mentioned member which represents the time necessary for the second object to traverse a unit of distance in its direction of relative movement.

21. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale for cooperation with a scale on the second mentioned member for determining the time necessary for the second object to traverse a unit of distance in its direction of relative movement, and a fourth member movably associated with said first and second mentioned members, said fourth mentioned member being provided with suitable markings for cooperation with the second mentioned member and the line on the first mentioned member to thus enable the solution of relative movement problems involving true courses.

22. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale for cooperation with a scale on the second mentioned member for determining the distance the second object moves relatively to the first for an assumed actual distance of movement of the second object.

23. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale of ratios of the speed of relative movement of the second object to the actual speed of the first object, said last mentioned scale being designed for cooperation with a scale on the second mentioned member which represents the distance the second object moves relatively to the first for an assumed actual distance of movement of the second object.

24. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a logarithmic scale of ratios of the speed of relative movement of the second object to the actual speed of the first object, said last mentioned scale being designed for cooperation with a scale on the second mentioned member which represents the distance the second object moves relatively to the first for an assumed actual distance of movement of the second object.

25. A device for solving relative movement problems encountered in the firing of torpedoes, comprising in combination a member provided with a line and a family of curves, the direction of the said line representing the course of the target relatively to which the torpedo is to move and the curves representing loci of ratios of the speed of relative movement of the torpedo to the actual speed of the target, each of said curves being constructed for a predetermined ratio of the speed of relative movement of the torpedo to the actual speed of the target and for various ratios of the actual speed of the torpedo to that of the target by a system of polar coordinates, the radial ordinate of which, for at least a portion of each curve, is measured to a logarithmic scale and represents the ratio of the actual speed of the torpedo to the actual speed of the target and the angular ordinate the direction of relative movement of the torpedo, a second member movably associated with said first mentioned member, a third member movably associated with said second mentioned member, said third mentioned member being provided with a logarithmic speed scale for cooperation with the family of curves and with a scale of ratios of the speed of relative movement of the torpedo to the actual speed of the target, said last mentioned scale being designed for cooperation with a scale on the second mentioned member which represents the maximum firing range of a torpedo having a predetermined range of travel.

26. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the family of curves and with a scale of ratios of the speed of relative movement of the second object to the actual speed of the first object, said last mentioned scale being designed for cooperation with a scale on the second mentioned member which represents ratios of the distance actually traversed by the second object to the distance the second object moves relatively to the first.

27. A device for solving relative movement problems, encountered in the firing of torpedos, comprising in combination a member provided with a line and a family of curves, the direction of the said line representing the course of the target relatively to which the torpedo is to move and the curves representing loci of ratios of the speed of relative movement of the torpedo to the actual speed of the target, each of said curves being constructed for a predetermined ratio of the speed of relative movement of the torpedo to the actual speed of the target and for various ratios of the actual speed of the torpedo to that of the target by a system of polar coordinates, the radial ordinate of which, for at least a portion of each curve, is measured to a logarithmic scale and represents the ratio of the actual speed of the torpedo to the actual speed of the target and the angular ordinate the direction of relative movement of the torpedo, a second member movably associated with said first mentioned member, a third member movably associated with said second mentioned member, said third mentioned member being provided with a logarithmic speed scale for cooperation with the family of curves and with a scale of ratios of the speed of relative movement of the torpedo to the actual speed of the target, said last mentioned scale being designed for cooperation with a scale on the second mentioned member which represents ratios of the distance actually run by the torpedo to the distance the torpedo moves relatively to the target.

28. A device for solving relative movement problems, comprising in combination a member provided with a line and a family of curves, the direction of the said line representing the course of a moving object relatively to which a second object is to move and the curves representing loci of ratios of the speed of relative movement of the second object to the actual speed of the first object, each of said curves being constructed for a predetermined ratio of the speed of relative movement of the second object to the actual speed of the first object and for various ratios of the actual speed of the second object to that of the first by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with the said first mentioned member, a third member movably associated with said second mentioned member, said third mentioned member being provided with a logarithmic speed scale for cooperation with the family of curves and with a scale of ratios of the speed of relative movement of the second object to the actual speed of the first object, said last mentioned scale being designed for cooperation with a scale on the second mentioned member which represents the distance the second object moves relatively to the first for an assumed actual distance of movement of the second object, and a fourth member movably associated with said first and second mentioned members, said fourth mentioned member being provided with suitable markings for cooperation with the second mentioned member and the line on the first mentioned member to thus enable the solution of relative movement problems involving true courses.

29. A device for solving relative movement problems, comprising in combination a member provided with a line, a first family and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which represents the ratio of the actual speed of the second object to the actual speed of the first object and the angular ordinate the direction of relative movement of the second object, a second member movably associated with said first mentioned member for cooperation with the two families of curves and provided with a series of markings which represent various ratios of the actual speed of the second object to that of the first, the said markings being placed on said second mentioned member with a scale equal to that used in determining the length of the radial ordinate of the system of polar coordinates.

30. A device for solving relative movement problems, comprising in combination a member provided with a line, a first family and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which represents the ratio of the actual speed of the second object to the actual speed of the first object and the angular ordinate the direction of relative movement of the second object, a second member movably associated with said first mentioned member for cooperation with the two families of curves and provided with a series of markings which represent various ratios of the actual speed of the second object to that of the first, the said markings being placed on said second mentioned member with a scale equal to that used in determining the length of the radial ordinate of the system of polar coordinates, and each of the curves of the first family of curves terminating outwardly at a point which is angularly spaced from the said line an amount equal in value to the course angle for which the curve is constructed.

31. A device for solving relative movement problems, comprising in combination a member provided with a line, a first family and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve is measured to a logarithmic scale and which represents the ratio of the actual speed of the second object to the actual speed of the first object and the angular ordinate the direction of relative movement of the second object, and a second member movably associated with said first mentioned member and supporting a slidable, logarithmic speed scale for cooperation with both families of curves.

32. A device for solving relative movement problems, comprising in combination a member provided with a line, a first family and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which represents the ratio of the actual speed of the second object to the actual speed of the first object and the angular ordinate the direction of relative movement of the second object, a second member movably associated with said first mentioned member for cooperation with the two families of curves and provided with a series of markings which represent various ratios of the actual speed of the second object to that of the first, the said markings being placed on said second mentioned member with a scale equal to that used in determining the length of the radial ordinate of the system of polar coordinates, and a third member movably associated with said first and second mentioned members, said third mentioned member being provided with suitable markings for cooperation with the second mentioned member and the line on the first mentioned member to thus enable the solution of relative movement problems involving true courses.

33. A device for solving relative movement problems, comprising in combination a disc provided with a line, a first family and a second family of curves, the said line extending in the direction of a diameter of the disc and representing the course of a moving object relatively to which a second object is to move and the families of curves representing course angles of the second object, with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, an arm pivotally mounted on said disc at its center and supporting a slidable, logarithmic speed scale for cooperation with both families of curves, each of the curves of the first family of curves terminating at the periphery of the disc in a point which is angularly spaced from the aforementioned line an amount equal in value to the course angle for which the curve is constructed, and a second disc which at its center is pivotally secured to the center of the first mentioned disc, said second mentioned disc being provided with suitable markings at its periphery for cooperation with the line on the first mentioned disc and the arm associated therewith to thus enable the solution of relative movement problems involving true courses.

34. A device for solving relative movement problems, comprising in combination a disc provided with a line, a first family and a second family of curves, the said line extending in the direction of a diameter of the disc and representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object and the first family of curves extending from the periphery of the disc to a speed circle whose center is coincident with that of the disc, an arm pivotally mounted on said disc at its center and supporting a slidable, logarithmic speed scale for cooperation with the speed circle and both families of curves, each of the curves of the first family of curves terminating at the periphery of the disc in a point which is angularly spaced from the aforementioned line an amount equal in value to the course angle for which the curve is constructed, and a second disc which at its center is pivotally secured to the center of the first mentioned disc, said second mentioned disc being provided with suitable markings at its periphery for cooperation with the line on the first mentioned disc and the arm associated therewith to thus enable the solution of relative movement problems involving true courses.

35. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar-coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents the time necessary for the second object to traverse a unit of distance in its direction of relative movement.

36. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents the time necessary for the second object to traverse a unit of distance in its direction of relative movement, and a fourth member movably associated with said first and second mentioned members, said fourth mentioned member being provided with suitable markings for cooperation with the second mentioned member and the line on the first mentioned member to thus enable the solution of relative movement problems involving true courses.

37. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents the distance the second object moves relatively to the first for an assumed actual distance of movement of the second object.

38. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents the distance the second object moves relatively to the first for an assumed actual distance of movement of the second object, and a fourth member movably associated with said first and second mentioned members, said fourth mentioned member being provided with suitable markings for cooperation with the second mentioned member and the line on the first mentioned member to thus enable the solution of relative movement problems involving true courses.

39. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents ratios of the distance actually traversed by the second object to the distance the second object moves relatively to the first.

40. A device for solving relative movement problems, comprising in combination a member provided with a line, a speed circle whose center is coincident with that of the member, a first family of curves extending outwardly from the speed circle, and a second family of curves, the direction of the said line representing the course of a moving object relatively to which a second object is to move and the families of curves representing respectively course angles of the second object with respect to the first and loci of ratios of the speed of relative movement of the second object to the actual speed of the first object, each of said curves of the first family of curves and each of said curves of the second family of curves being constructed for various ratios of the actual speed of the second object to that of the first and respectively for a predetermined course angle and ratio of the speed of relative movement of the second object to the actual speed of the first object by a system of polar coordinates, the radial ordinate of which, for at least a portion of each curve, is measured to a logarithmic scale and represents the ratio of the actual speed of the second object to the actual speed of the first object and the angular ordinate the direction of relative movement of the second object, a second member movably associated with said first mentioned member, a third member movably associated with said second mentioned member, said third mentioned member being provided with a logarithmic speed scale for cooperation with the speed circle and both families of curves and with a scale of ratios of the speed of relative movement of the second object to the actual speed of the first object, said last mentioned scale being designed for cooperation with a scale on the second mentioned member which represents ratios of the distance actually traversed by the second object to the distance the second object moves relatively to the first, and a fourth member movably associated with said first and second mentioned members, said fourth mentioned member being provided with suitable markings for cooperation with the second mentioned member and the line on the first mentioned member to thus enable the solution of relative movement problems involving true courses.

RUSSELL WILLSON.